Nov. 20, 1962   A. L. LEE ETAL   3,064,488
CONSTANT MESH TRANSMISSION
Filed Sept. 6, 1960   10 Sheets-Sheet 1
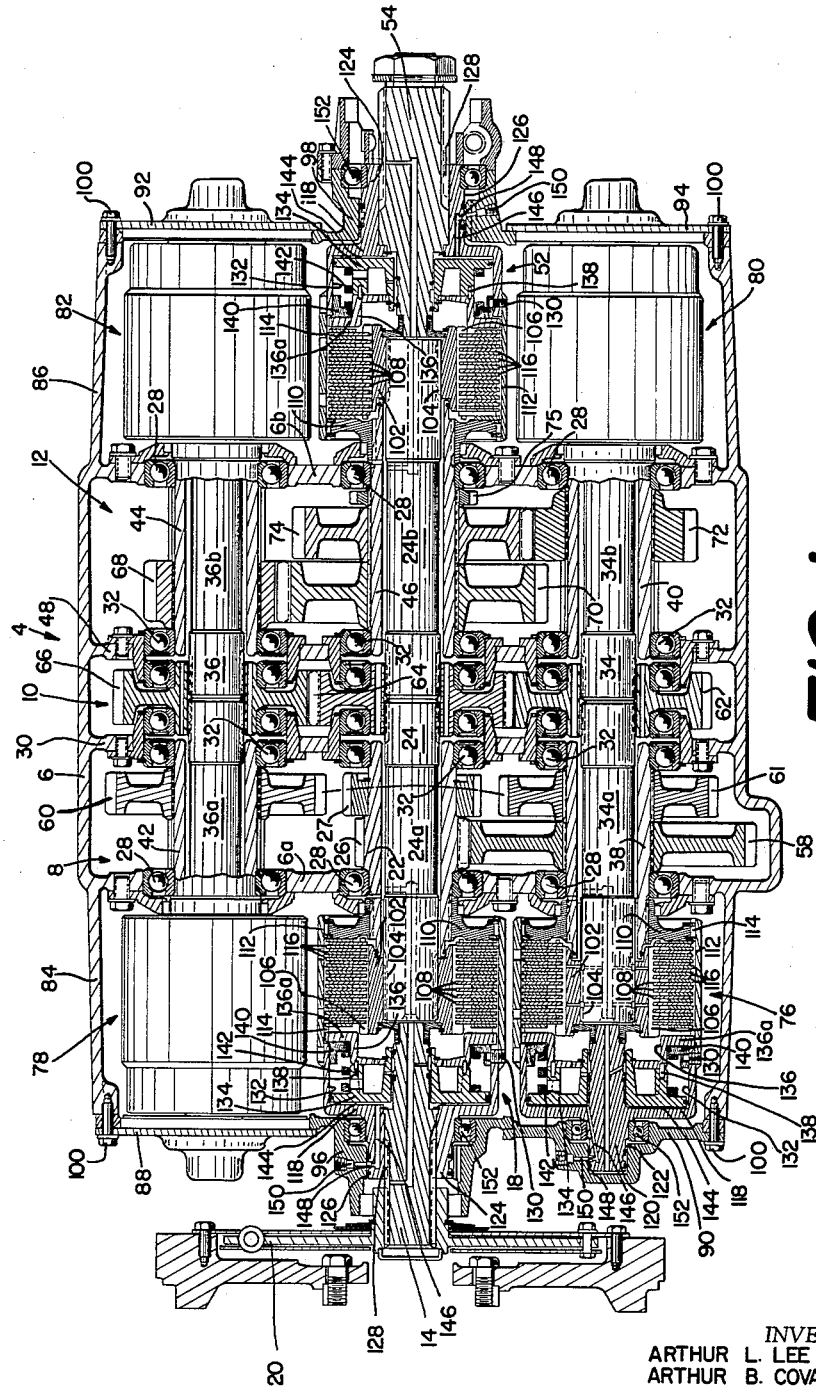
FIG. I
INVENTOR.
ARTHUR L. LEE
ARTHUR B. COVAL
BY Stanley J. Rich
their ATTORNEY Nov. 20, 1962
A. L. LEE ETAL
3,064,488
CONSTANT MESH TRANSMISSION
Filed Sept. 6, 1960
10 Sheets-Sheet 2
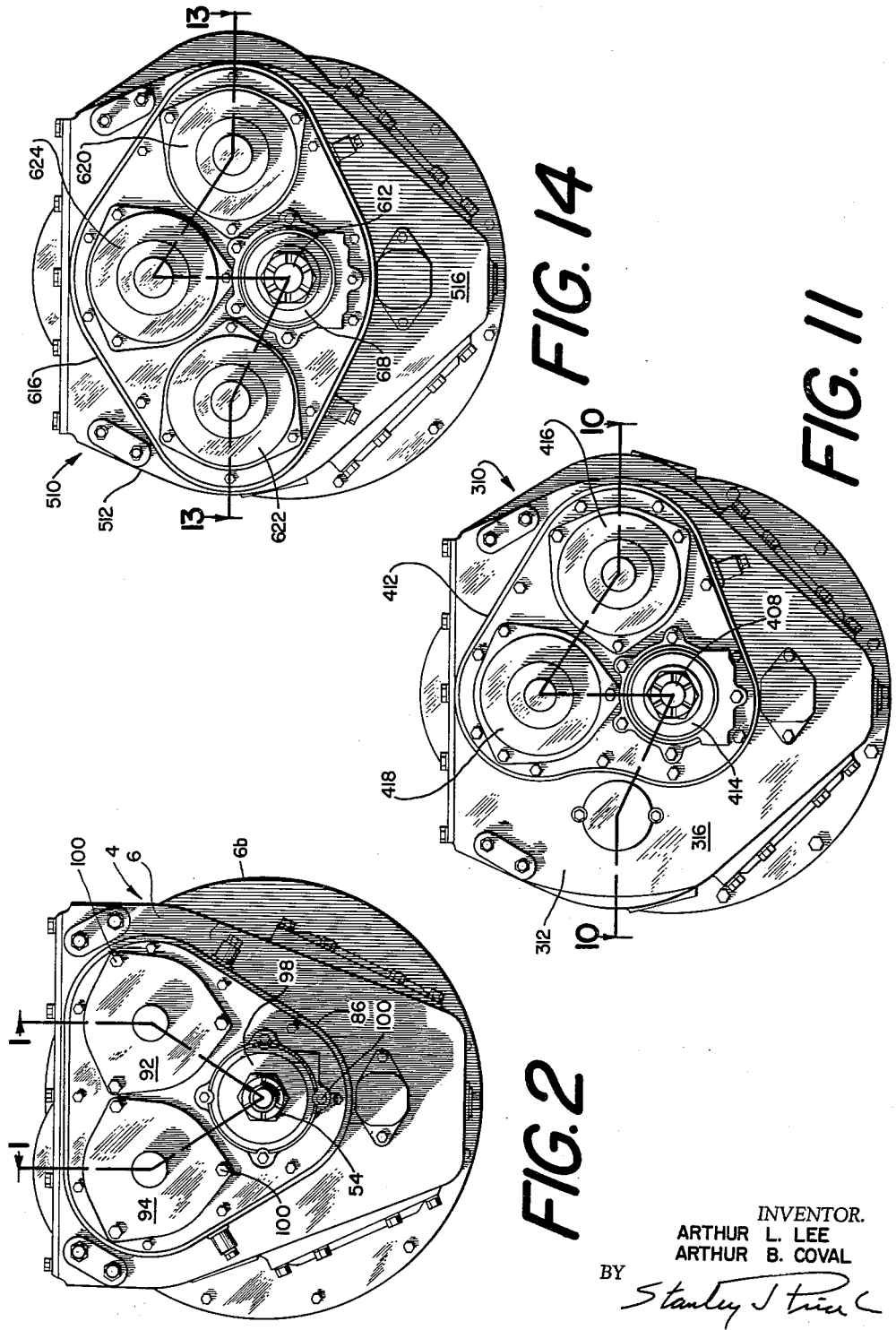
INVENTOR.
ARTHUR L. LEE
ARTHUR B. COVAL
BY
Stanley J. Price
their ATTORNEY

INVENTOR.
ARTHUR L. LEE
ARTHUR B. COVAL
BY
ATTORNEY

Nov. 20, 1962

A. L. LEE ETAL 3,064,488

CONSTANT MESH TRANSMISSION

Filed Sept. 6, 1960

INVENTORS
ARTHUR L. LEE
ARTHUR B. COVAL
BY
their ATTORNEY

Nov. 20, 1962   A. L. LEE ETAL   3,064,488
CONSTANT MESH TRANSMISSION
Filed Sept. 6, 1960   10 Sheets-Sheet 6

INVENTORS
ARTHUR L. LEE
ARTHUR B. COVAL
BY
*Stanley J Price*
*Their* ATTORNEY

Nov. 20, 1962    A. L. LEE ETAL    3,064,488
CONSTANT MESH TRANSMISSION
Filed Sept. 6, 1960    10 Sheets-Sheet 7

INVENTOR.
ARTHUR L. LEE
ARTHUR B. COVAL
BY Stanley J Price
ATTORNEY

Nov. 20, 1962  A. L. LEE ETAL  3,064,488
CONSTANT MESH TRANSMISSION
Filed Sept. 6, 1960  10 Sheets-Sheet 8

INVENTOR.
ARTHUR L. LEE
ARTHUR B. COVAL
BY Stanley J Price
their ATTORNEY

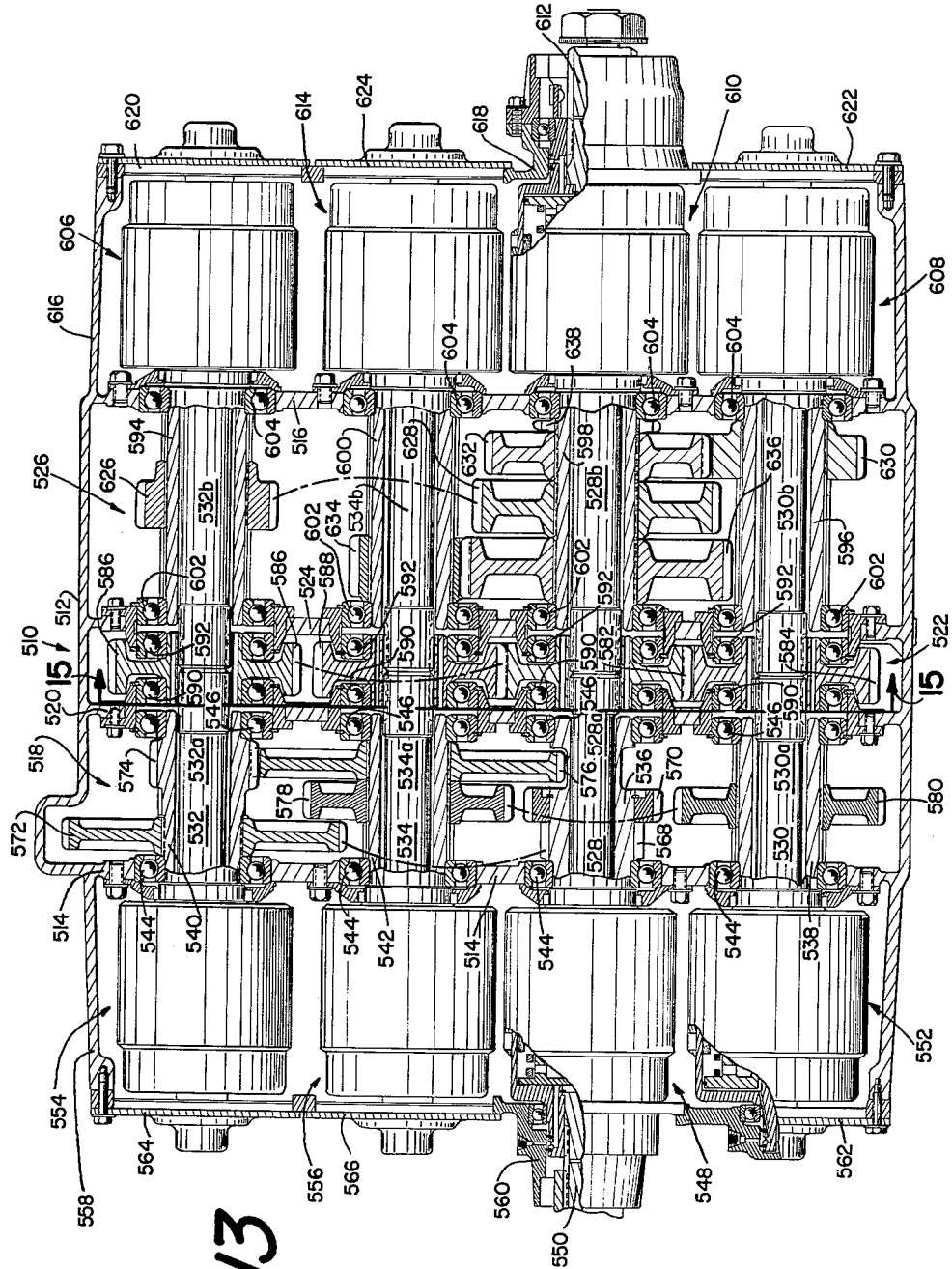

Nov. 20, 1962   A. L. LEE ETAL   3,064,488
CONSTANT MESH TRANSMISSION
Filed Sept. 6, 1960   10 Sheets-Sheet 10

INVENTOR.
ARTHUR L. LEE
ARTHUR B. COVAL
BY
Stanley J Price
their ATTORNEY

United States Patent Office 3,064,488
Patented Nov. 20, 1962

3,064,488
CONSTANT MESH TRANSMISSION
Arthur L. Lee and Arthur B. Coval, Columbus, Ohio, assignors to Consolidation Coal Company, Pittsburgh, Pa., a corporation of Pennsylvania
Filed Sept. 6, 1960, Ser. No. 54,253
28 Claims. (Cl. 74—360)

This invention relates to a constant mesh transmission having a plurality of speed ratios in each direction of operation and more particularly to a constant mesh transmission which has a plurality of selectively engageable speed ranges and a plurality of speed ratios adapted to be selectively engaged for each of the speed ranges.

Specifically, this invention is an improvement of the hydraulically controlled transmission disclosed in Reissue Patent No. 24,327, issued June 11, 1957 to A. L. Lee. This application is a continuation-in-part of our copending United States patent application Serial No. 732,741, filed May 2, 1958, and now abandoned.

The transmission shown and described in the above named Lee patent has three speed ratios in the forward direction and three speed ratios in the reverse direction. This speed arrangement has proved very satisfactory in haulage type vehicles that are employed in shuttle type haulage work at the same job site for extended periods of time. The present invention is an improvement of the above named transmission in that the present invention adds additional available speed ratios to that transmission and also provides a substantially straight-through drive as one speed ratio. The additional speed ratios make the improved transmission suitable for use with automotive vehicles as well as with heavy duty haulage vehicles that are subject to rugged haulage conditions such as off-highway haulage on uneven terrain and steep, uneven grades. Although we have added available speed ratios to the transmission disclosed in Reissue Patent No. 24,327, it should be noted that other meritorius features such as the constant mesh spur type gearing and the external clutches taught by the Lee reissue patent are still retained in this improved transmission.

The present invention provides a transmission which has a plurality of constantly meshing spur gears that provide selective drive paths through the transmission upon selective engagement of the transmission clutches. Broadly, the transmission provides a plurality of speed ranges, each of which may be utilized by engaging the one appropriate directional clutch controlling that particular speed range. The transmission also provides a plurality of individual speed ratios, each of which may be employed by engaging the one appropriate clutch controlling that particular speed ratio. Thus, by engaging one directional clutch to provide a desired speed range and by engaging one speed ratio clutch to provide a desired speed ratio within the range, a particular power path through the transmission is provided. Since each speed ratio may be utilized with each speed range, the number of available ranges multiplied by the number of available speed ratios is the number of overall speed ratios available from the transmission.

The transmission of the present invention has a novel arrangement of elements in that the transmission housing is divided longitudinally into a range section, a connecting section, and a speed ratio section. The range section is at the forward end of the transmission, adjacent the transmission input shaft and nearest the prime mover. The range section houses the gears which provide the various speed ranges for the transmission. The directional clutches, which are engaged selectively to provide the desired range, extend out of the transmission housing at the forward end of the transmission.

The connecting section of the transmission housing occupies the center portion of the housing between the forward and rear end portions. The connecting section contains the spur gears that are fixed to, and rotatable with, the countershafts of the transmission. These spur gears interconnect the countershafts so that all the countershafts rotate when any one of the countershafts is driven. The countershafts extend longitudinally through the transmission housing from the range section to the speed ratio section. When a particular directional clutch is engaged, it forms a driving connnection between the transmission input shaft and one of the transmission countershafts through the gears housed within the range section. The driving connection is extended from the particular countershaft to the remaining countershafts by the intermeshing connecting gears fixed to each of the countershafts and housed within the connection section.

The speed ratio section of the transmission housing is located at the rear end of the transmission adjacent the transmission output shaft. The speed ratio section houses the gears which provide the driving connections, at various speed ratios, from the rotating countershafts to the transmission output shaft. The speed ratio clutches extend out of the transmission housing speed ratio section at the rear of the transmission.

The transmission of the present invention is reversing in that it has several reverse speed ratios. Operatively, a shift to reverse drive is similar to a range change. The reverse drive gear is housed within the range section of the housing and the reverse clutch is one of the directional clutches provided at the forward end of the transmission. Accordingly, drive may be transmitted from the transmission input shaft, through the countershafts to the output shaft in either direction, depending upon whether a forward directional clutch or the reverse clutch is engaged. As utilized in the transmission art, the term countershaft designates a shaft which rotates in either direction under varying operating conditions.

Several advantages accrue from the arrangement of the transmission with the range section adjacent the forward end, the speed ratio section adjacent the rear end, and the connecting section in the center of the transmission housing. The range gears, housed within the range section, are in a constant mesh gear train with the transmission input shaft. Thus, they rotate at approximately the speed of the input shaft and vary in speed only insofar as their pitch diameters are different. The range gears, then, undergo only the change in rotating speed that the transmission input shaft and the prime mover undergo. There is no shift of the range gears to higher speeds by interposing speed ratio gears between the prime mover and the range gears under certain speed ratio conditions as occurs in many known transmissions. Since the range gears are in a constant mesh gear train with the input shaft, the range shifts may be made relatively smoothly because the rotating masses of the range gears are closely matched to the prime mover speed.

In a like manner, the speed ratio gears are in constant mesh with the transmission output shaft. The directional clutch that is engaged determines the range to be utilized and controls the speed and direction of the countershafts. The drive from the countershafts is transmitted to the output shaft through any one of the speed ratio clutches. Thus, the speeds of the transmission may be changed by engaging various speed ratio clutches without disengaging the range clutches or disturbing them in any way.

As a variation of this feature, the transmission of the present invention can also be readily adapted for shuttle work where the speed ratios in each direction of operation should be different. For example, in operating a front end loader, it is often desirable that the movement in the forward direction be at a slow speed and produce a high torque, while it is desirable that the reverse movement occur at a higher speed with the torque requirement being much less. Under such circumstances, the transmission of the present invention can be set in a preselected speed ratio. The reversing can be accomplished by engaging a low range directional clutch to accomplish forward movement at high torque; and then disengaging the low range directional clutch and engaging the reverse directional clutch to accomplish reverse movement at somewhat higher speeds. Thus, reversing of the transmission can be accomplished without disturbing the speed ratio clutches.

The arrangement of a transmission with a range section, a connecting section and a speed ratio section also results in advantages in manufacturing the transmission. In the transmission of the present invention, the speed ratio section of a transmission may be varied so that a greater or lesser number of speeds may be made available without varying the other sections of the transmission. Likewise, a range section from a transmission may be completely replaced by a range section having a different combination of gear ratios to provide a different set of speed ranges for the transmission. Thus, flexibility of manufacture may be maintained since a great variety of transmission arrangements may be assembled from a minimum number of basic parts.

With the foregoing considerations in mind, it is a principal object of the present invention to provide an improved constant mesh transmission.

Another object of this invention is to provide a transmission having a plurality of speed ratios in both directions and a plurality of speed ranges in one direction.

A further object of this invention is to provide a transmission having a plurality of speed ratios in both directions that is easy to fabricate, assemble, install and maintain.

Another object of this invention is to provide a transmission divided into a range section, a connecting section, and a speed ratio section to improve transmission operation and facilitate manufacture.

Another object of this invention is to provide a transmission in which the speed ranges may be changed without disengaging or disturbing the speed ratios.

Another object of this invention is to provide a transmission in which the speed ratios may be changed without disengaging or disturbing the speed ranges.

These and other objectives achieved by this invention will become apparent as this description proceeds in conjunction with the accompanying drawings.

In the drawings:

FIGURE 1 is a developed longitudinal section taken along the line 1—1 of FIGURE 2 showing a transmission having six speed ratios in one direction of operation and three speed ratios in the other direction;

FIGURE 2 is a rear elevational view on a reduced scale of the transmission of FIGURE 1;

Figure 16:
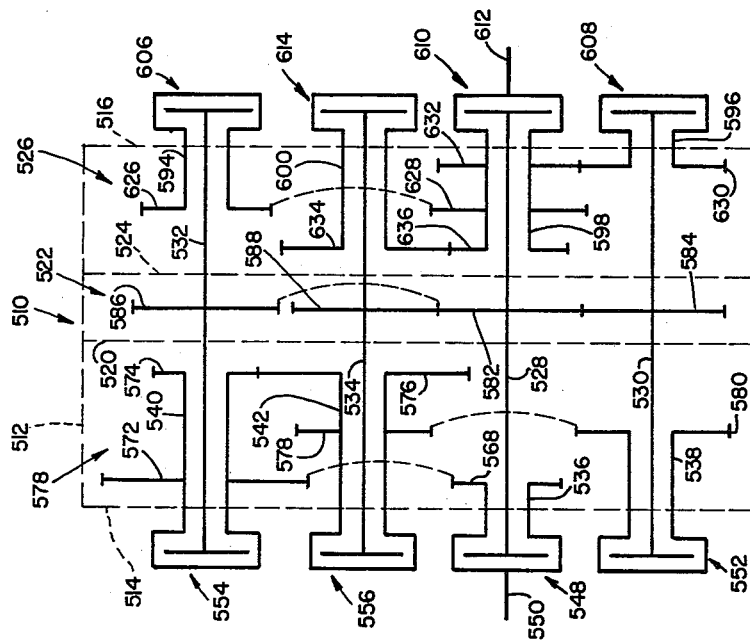
Figure 6:
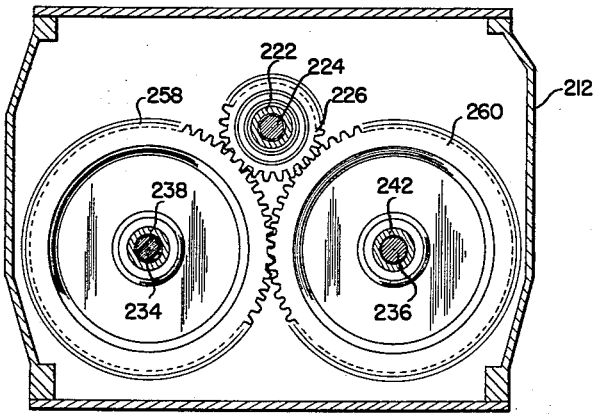
Figure 5:
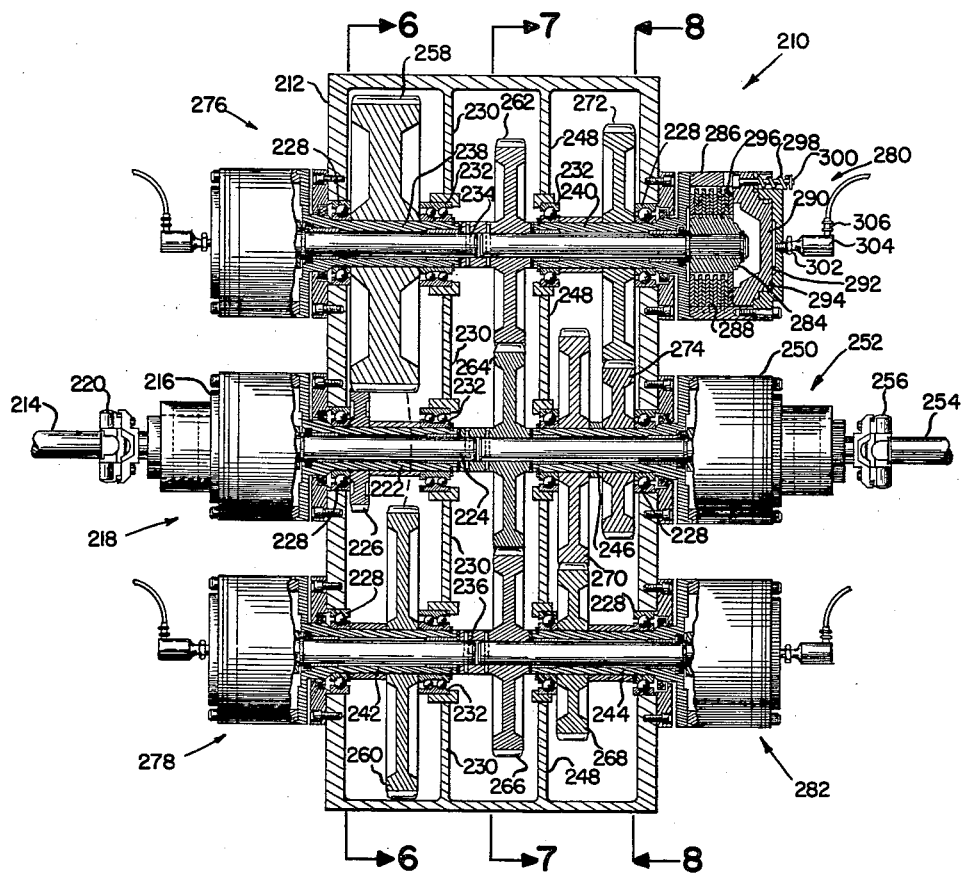
FIGURE 5 is a developed longitudinal section taken along the line 5—5 of FIGURE 4 showing the transmission gears, shafts and associated clutches.
Figure 7:
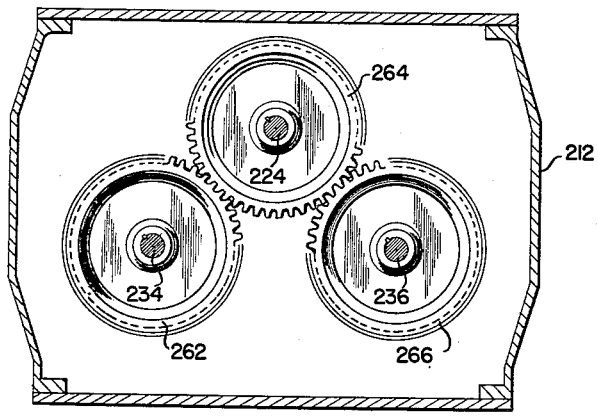
Figure 8:
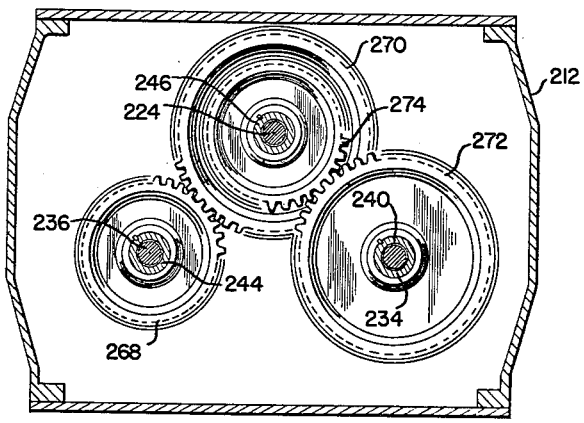
Figure 12:
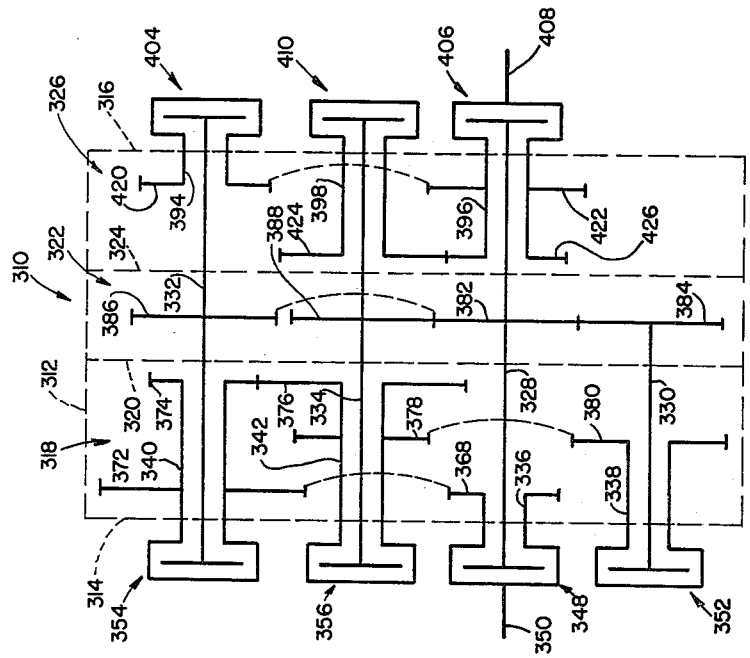
Figure 9:
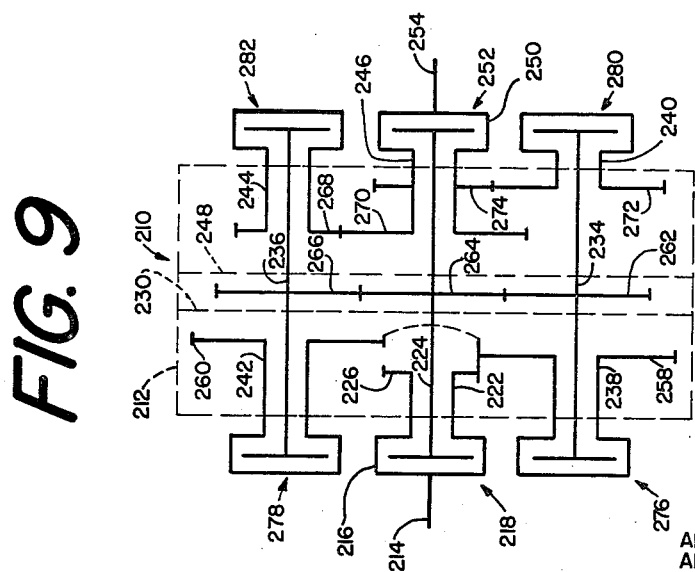
Figure 10:
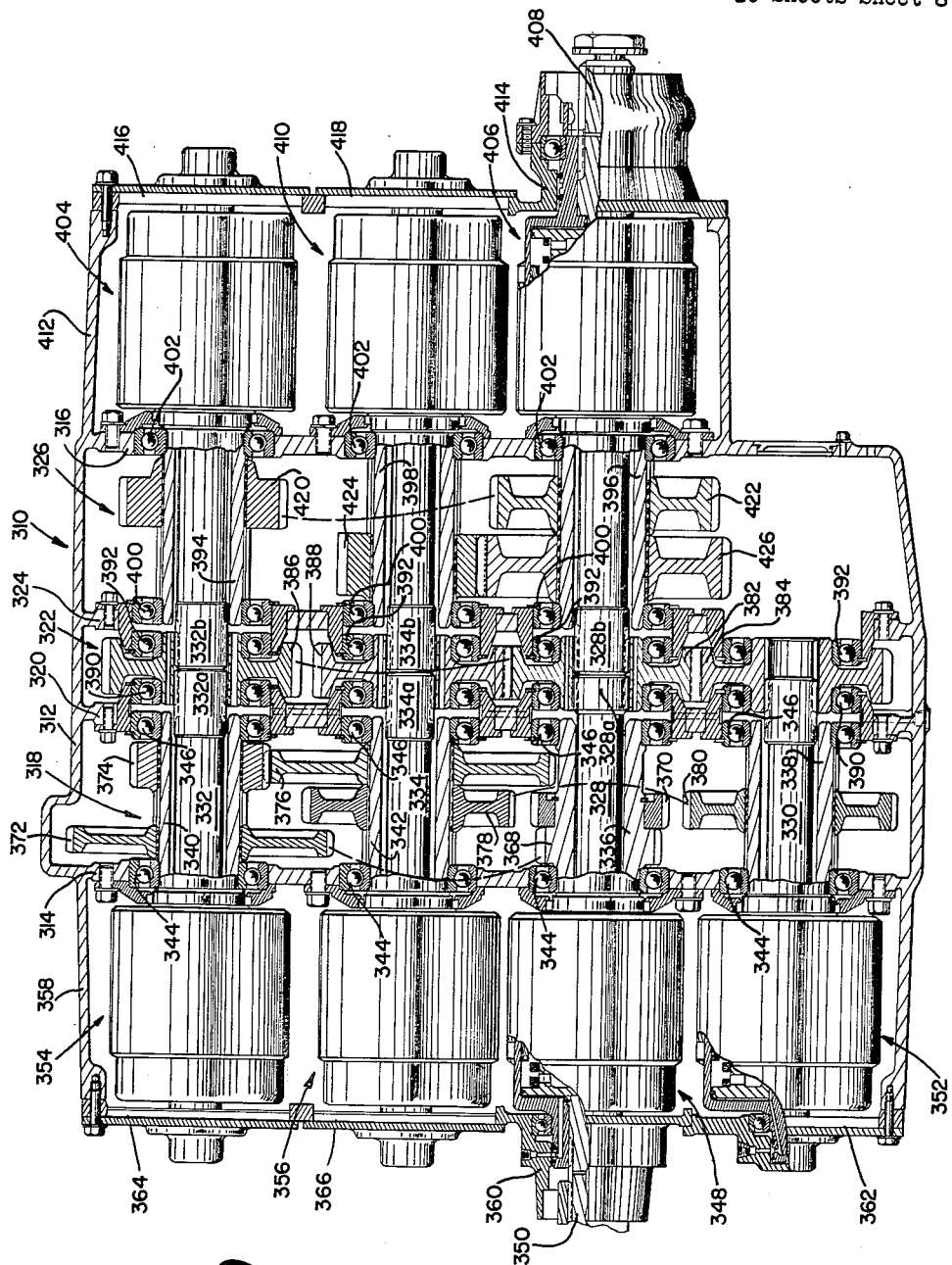
Figure 15:
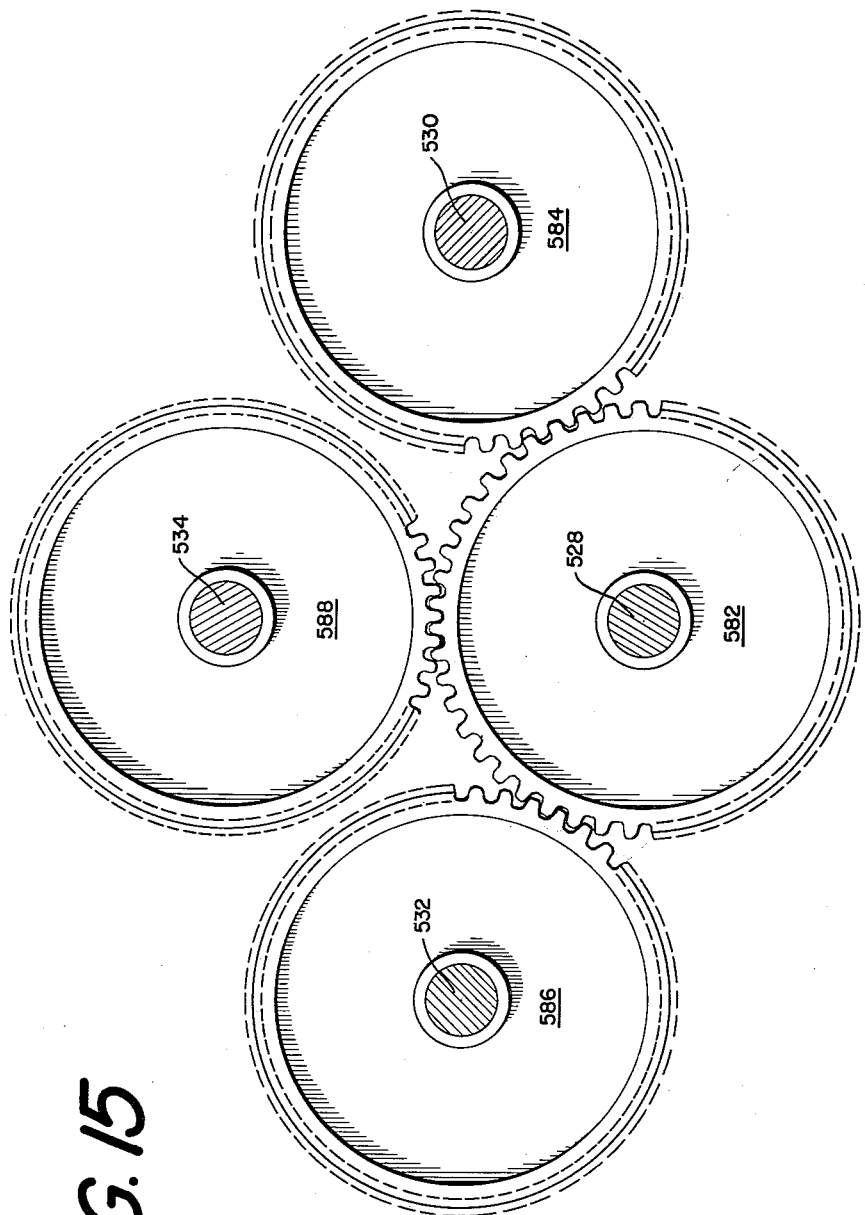

FIGURES 6, 7 and 8 are cross sectional views taken substantially along the lines 6—6, 7—7 and 8—8 respectively of FIGURE 5;

FIGURE 9 is a schematic representation of the embodiment of FIGURES 4–8;

FIGURE 10 is a developed longitudinal section taken along the line 10—10 of FIGURE 11 showing a third embodiment of the transmission having nine speed ratios in one direction of operation and three speed ratios in the other direction;

FIGURE 11 is a rear elevational view on a reduced scale of the transmission of FIGURE 10;

FIGURE 12 is a schematic representation of the embodiment of FIGURES 10 and 11;

FIGURE 13 is a developed longitudinal section taken along the line 13—13 of FIGURE 14 showing a fourth embodiment of the transmission having twelve speed ratios in one direction of operation and four speed ratios in the other direction;

FIGURE 14 is a rear elevational view on a reduced scale of the transmission of FIGURE 13;

FIGURE 15 is a cross sectional view on an enlarged scale taken substantially along the line 15—15 of FIGURE 13 with the bearings and bearing supports omitted for clarity, showing the position of the connecting gears and shafts;

FIGURE 16 is a schematic representation of the embodiment of FIGURES 13–15.

EMBODIMENT OF FIGURES 1–3

*Six Forward and Three Reverse Speed Ratios*

Figure 3:
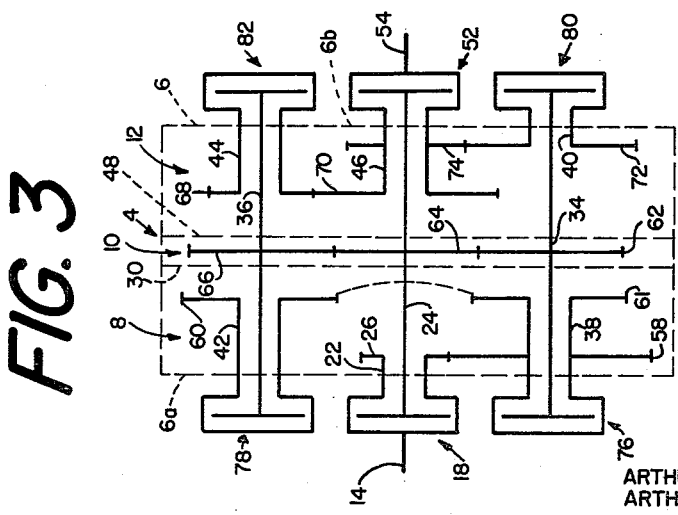
FIGURE 3 is a schematic representation of the transmission of FIGURES 1 and 2.
Figure 4:
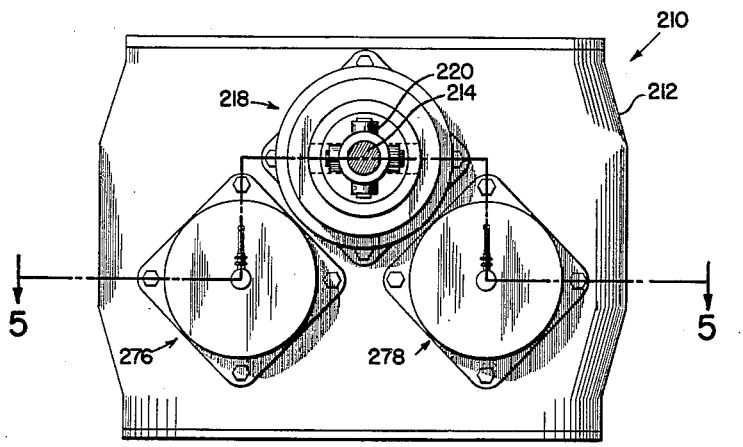
FIGURE 4 is an end elevational view of a second embodiment of the improved transmission mechanism having six speed ratios in one direction of operation and three speed ratios in the other direction.

Referring to FIGURES 1–3 which illustrate one embodiment of our invention, the details of construction are shown in FIGURES 1 and 2, while the major components of the transmission, the gears, shafts and clutches, are represented schematically in their relative positions in FIGURE 3, a view similar to FIGURE 1. The improved transmission mechanism generally designated by the numeral 4 has a housing 6 adapted to contain a lubricant bath. The housing 6 encloses the spur gears and shafts which revolve in the lubricant bath. The transmission housing 6 is divided longitudinally into three separate sections, a range section 8, a connecting section 10, and a speed ratio section 12. Each of these sections 8, 10 and 12 enclose the spur gears which are included in the range section, connecting section, and speed ratio section respectively of the improved transmission mechanism.

A prime mover, not shown, drives a propeller shaft or transmission input shaft 14 which is connected to the exterior housing of clutch 18 in a manner to be described. The transmission input shaft 14 may be connected to the prime mover by means of a flexible connection 20 which attaches to the fly wheel of the prime mover (not shown). The prime mover employed is preferably unidirectional so that the transmission input shaft 14 and the external housing of clutch 18 rotate in only one direction irrespective of the direction of rotation of the transmission output shaft. The external housing of clutch 18 is nonrotatably secured to a tubular shaft 22 that is coaxially positioned on a first countershaft 24 and is freely rotatable thereon. The term "countershaft" as employed in the specification and claims is intended to designate a shaft that is adapted to rotate in either direction. A spur gear 26 is nonrotatably secured to the tubular shaft 22 for rotation therewith. The tubular shaft 22 is supported adjacent the housing of clutch 18 by means of a roller bearing 28 and at its other end is supported in an aperture in the first inner wall 30 of transmission housing 6 by means of roller bearings 32. Also nonrotatably secured to the tubular shaft 22 is an accessory drive gear 27 that rotates at the speed of tubular shaft 22 and, therefore, at the speed of the external housing of clutch 18 and the transmission input shaft 14. The high range spur gear 26 and the accessory drive gear 27 are each located within the range section 8 of transmission housing 6 forward of the first inner wall 30 that separates the range section 8 from the connecting section 10 of transmission housing 6.

A pair of countershafts 34 and 36 are arranged within the transmission housing 6 in spaced, parallel relation to each other and to the countershaft 24. The countershafts 24, 34 and 36 are suitably journaled for rotation within the housing 6 and each has its end portion extending through the forward end wall 6a and rear end wall 6b respectively of the housing 6. As illustrated in FIGURE 1, the countershafts 24, 34 and 36 are each of two piece construction in that they include countershaft sections 24a and 24b, 34a and 34b, and 36a and 36b respectively. The countershafts 24, 34 and 36 are formed in two sections to facilitate assembly of the transmission. Functionally, however, the countershafts 24, 34 and 36 operate as a single unit and they could be of one piece construction and not impair the operation of the transmission.

The countershaft 34 has a pair of tubular shafts 38 and 40 arranged coaxially thereon in rotatable relation thereto. Similarly, the countershaft 36 also has a pair of tubular shafts 42 and 44 arranged coaxially thereon in rotatable relation thereto. Countershaft 24 has a second tubular shaft 46 arranged coaxially thereon in rotatable relation thereto. Each of the tubular shafts 38, 40, 42, 44, 22 and 46 has an end portion extending beyond an end wall 6a or 6b respectively of the housing 6. The end walls 6a and 6b of the housing 6 have roller bearings 28 poistioned therein to suitably rotatably support the respective tubular shafts. The housing has a first inner wall 30 that separates the range section from the connecting section and a second inner wall 48 that separates the connecting section from the speed ratio section which also carry roller bearings 32 therein to rotatably support the respective tubular shafts.

The end portion of tubular shaft 46 that extends beyond the housing end wall 6b is nonrotatably secured to the external housing of the clutch 52. The external housing of the clutch 52 is connected to an output shaft 54 in a manner to be described. Thus, the rotation of input shaft 14 is transmitted through the external housing of clutch 18, thence through the transmission 4 to the external housing of clutch 52 and to output shaft 54.

Within the range section 8, forward directional low range spur gear 58 is nonrotatably secured to the tubular shaft 38 coaxially positioned on countershaft 34. The high range spur gear 26, nonrotatably secured to tubular shaft 22 on countershaft 24, is in meshing relation with forward directional low range spur gear 58. A reverse directional gear 60 is nonrotatably secured to the tubular shaft 42 that is coaxially positioned on countershaft 36. A reverse idler gear 61 is nonrotatably secured to the tubular shaft 38 coaxially positioned on countershaft 34. The reverse directional spur gear 60 is in meshing relation with the reverse idler gear 61 which is nonrotatably fixed to forward directional low range spur gear 58 through tubular shaft 38. It will be noted that high range spur gear 26, forward directional low range spur gear 58, reverse idler gear 61, and reverse directional gear 60 form a constantly meshing gear train so that tubular shafts 22, 38, and 42 each rotate whenever the transmission input shaft 14 is rotated.

Within the connecting section 10, each of the countershafts 34, 24, and 36 has a connecting gear 62, 64 and 66 respectively nonrotatably secured thereto for rotation therewith. The connecting gear 62 is in meshing relation with the connecting gear 64 and the connecting gear 66 is in meshing relation with connecting gear 64. With this arrangement, the rotation of any of the countershafts 34, 24 or 36 causes rotation of the remaining countershafts through the intermeshing connecting gears 62, 64 and 66.

Within the speed ratio section 12, a low speed gear 68 is nonrotatably secured to the tubular shaft 44 and is rotatable therewith. The low speed gear 68 is in meshing relation with a spur gear 70 nonrotatably secured to the tubular shaft 46. A high speed spur gear 72 is nonrotatably secured to the tubular shaft 40 and is in meshing relation with the spur gear 74 that is also nonrotatably secured to the tubular shaft 46 that is coaxial with countershaft 24. An accessory drive gear 75 is also nonrotatably secured to tubular shaft 46 which is secured to the external housing of clutch 52. Accordingly, since the tubular shaft 46 is nonrotatably connected to the external housing of clutch 52, which is in turn nonrotatably connected to the output shaft 54, accessory drive gear 75 rotates at the speed of output shaft 54.

Arranged exteriorly of the housing 6 beyond housing end walls 6a and 6b are the following clutches:

Directional clutches:
  76 Forward low range clutch which is arranged to frictionally engage tubular shaft 38 to countershaft 34.
  18 Forward high range clutch which is arranged to frictionally engage tubular shaft 22 to countershaft 24.
  78 Reverse low range clutch which is arranged to frictionally engage tubular shaft 42 to countershaft 36.

Speed ratio clutches:
  80 High speed clutch which is arranged to frictionally engage the tubular shaft 40 with countershaft 34.
  52 Intermediate speed clutch which is arranged to frictionally engage the tubular shaft 46 with countershaft 24.
  82 Low speed clutch which is arranged to frictionally engage tubular shaft 44 with countershaft 36.

The above enumerated clutches are of the hydraulically operated multiple disc type and are arranged exteriorly of the transmission housing within clutch casings 84 and 86 formed at either end of transmission housing 6. The clutch casings 84 and 86 form chambers on the end of the transmission housing 6 within which external clutches 18, 52, 76, 78, 80 and 82 are disposed for protection. The clutch protective casings 84 and 86 each have a plurality of individual clutch casing end plates 88, 90, 92 and 94. These end plates permit ready access to the individual clutches of the transmission for maintenance and repair. The end plates 92 and 94 on clutch housing 86 are best seen in FIGURE 2.

A modified clutch casing end plate 96 is provided on clutch casing 84 and a modified clutch casing end plate 98 is provided on clutch casing 86. Modified clutch casing end plates 96 and 98 permit extension of the input shaft 14 and output shaft 54 respectively through the clutch protective casings 84 and 86 so that input shaft 14 and output shaft 54 may be nonrotatably secured to the external housing of clutches 18 and 52 respectively. The clutch protective casing end plates 88, 90, 92, 94, 96 and 98 are removably secured to clutch protective casings 84 and 86 by bolts 100.

For illustrative purposes, the forward high range directional clutch 18, the forward low range directional clutch 76, and the intermediate speed ratio clutch 52 are shown in section in FIGURE 1. It will be noted that these clutches are of two general types. The standard clutch, exemplified by forward low range clutch 76 is adapted to frictionally engage a countershaft to its surrounding tubular shaft. Forward low range clutch 76, reverse directional clutch 78, high speed ratio clutch 80 and low speed ratio clutch 82 are standard clutches and are identical in construction. The high range directional clutch 18 and the intermediate speed ratio clutch 52 are of modified construction in that the input shaft 14 and the output shaft 54 respectively are secured to the external housings of these clutches. While clutches 18 and 52 are somewhat modified, they are generally similar in construction to the other clutches of the transmission. The constructional details of clutches 76, 18 and 52 will be described simultaneously with like reference numerals applied to similar parts of each of the clutches. Where the construction of the standard and modified clutches differs, reference will be made to those differences and the construction of each will be described in detail.

Each of the clutches 76, 18 and 52 has a clutch hub member 102 which is nonrotatably secured to the appropriate countershaft by spline connection 104. Hub member 102 has the splined outer surface 106 which is adapted to nonrotatably receive a plurality of annular clutch friction plates 108 having splined internal portions. The annular friction plates 108 are adapted to rotate with hub member 102 and are free to move axially relative to clutch hub member 102.

Each clutch has a clutch housing annular support member 110 nonrotatably secured to the appropriate tubular shaft for rotation therewith. The annular support member 110 has a splined outer periphery which engages a cylindrical clutch housing 112 that has a splined internal surface 114. The cylindrical clutch housing 112 is nonrotatably and axially fixed to clutch housing annular support 110. A plurality of annular clutch friction plates 116 having a splined outer periphery are slidingly disposed within cylindrical clutch housing 112 so that they mesh with the splined internal surface of cylindrical clutch housing 112. The annular clutch friction plates 116 are nonrotatably carried by cylindrical clutch housing 112 but are free to move axially relative thereto. The friction plates 108 carried by clutch hub member 102 are alternately interleaved with the clutch friction plate 116 carried by the cylindrical clutch housing 112. When an axial force is exerted on the friction plates 108 and 116, they move into frictional engagement with each other thereby frictionally engaging the clutch hub member 102 to the cylindrical clutch housing 112.

The outwardly extending end of cylindrical clutch housing 112 has a clutch end enclosure 118 nonrotatably disposed therein. The clutch end enclosures 118 are of two different types, depending upon whether the clutch is to nonrotatably receive a shaft secured to the outer housing (modified) or not (standard). On the standard clutch, exemplified by forward low range clutch 76, which does not have a shaft affixed to its external surface, the clutch end enclosure 118 has a core portion 120 extending axially therethrough. The core portion 120 has a cylindrical external surface 122.

On the modified clutches which have an input shaft 14 or an output shaft 54 nonrotatably secured to the external housing, as exemplified by forward high range directional clutch 18 and intermediate speed change speed clutch 52, the clutch end enclosure 118 has an annular flange portion 124 extending therefrom. The flange portion 124 has a cylindrical external surface 126 and a splined internal surface 128. The splined internal surface is adapted to receive a splined portion of the input shaft or output shaft to be nonrotatably secured to the external clutch housing. A plurality of set screws 130 are provided to nonrotatably secure either type of clutch end enclosure 118 within the cylindrical clutch housing 112.

Each type of clutch end enclosure 118 has a cylindrical internal surface 132. An annular piston 134 is disposed within clutch end enclosure 118 and slidingly and sealingly engages the cylindrical internal surface 132. An annular clutch operating member 136 extends axially inwardly from annular piston 134 and is secured thereto by dowel pins 138. The annular clutch operating member 136 has a splined periphery which is received within the splined internal surface of clutch cylindrical housing 112. Annular operating member 136 may, therefore, be moved axially into engagement with the clutch friction plates 108 and 116 but can not rotate relative to clutch housing 112.

An annular abutting member 140 is nonrotatably and axially secured within clutch end enclosure 118 between annular piston 134 and the operating end 136a of annular clutch operating member 136. A helical spring 142 surrounds annular piston 134 and abuts both the annular piston 134 and the annular abutting member 140. Helical spring 142 urges the piston 134 axially away from the clutch friction plates 108 and 116.

An annular chamber 144 is formed within the clutch end enclosure 118 behind the annular piston 134. When fluid under pressure is admitted to chamber 144, annular piston 134 is urged axially against the force of helical spring 142 so that the annular clutch operating member 136 abuts the clutch friction plates 108 and 116 thereby urging them axially into contact with each other so that the clutch hub member 102 is engaged to the cylindrical housing member 112. When fluid is vented from chamber 144, the helical spring 142 returns the piston 134 and the clutch hub member 102 is again free to rotate relative to the cylindrical housing member 112.

In order to provide fluid under pressure to annular chambers 144, each type of clutch end enclosure 118 has fluid passages 146 formed therein. Passages 146 communicate with an annular recess 148 formed in the core portion 120 of the standard clutch end enclosure and formed in the flange portion 124 of the modified end enclosure. The annular recesses 148 formed in clutch end enclosures 118 communicate with fluid passages 150 formed in the respective clutch casing end plates 88, 90, 92, 94, 96, and 98. Fluid under pressure may be conducted into passages 150 which are fixed relative to the transmission housing in order to engage the various clutches. The passages 150 are in constant communication with the annular recesses 148 formed in clutch end enclosures 118 as end enclosures 118 rotate relative to the respective clutch casing end plates. Bearing assemblies 152 support the respective clutch end enclosures 118 for rotation within the respective end plates.

As previously stated, the reverse directional clutch 78, the high speed clutch 80 and the low speed clutch 82, which are not shown in detail, are identical to the low range directional clutch 76 which is shown in detail. The details of the various clutches are set forth for illustrative purposes only. It should be understood that other types of clutches could be used with equal facility in the present improved transmission mechanism.

The transmission 4 is capable of providing six speed ratios in the forward direction and three speed ratios in the reverse direction. For clarity, reference may be had to the schematic FIGURE 3 as the various speed ratio conditions are described in detail. The rotation of input shaft 14 rotates the external housing of clutch 18 which in turn rotates the tubular shaft 22 that is nonrotatably connected thereto. The rotation of tubular shaft 22 is transmitted through spur gear 26 to forward directional gear 58 and through spur gear 26, forward directional gear 28, and reverse idler gear 61 to reverse directional gear 60. Engagement of either forward low range directional clutch 76 or reverse directional clutch 78 couples the respective tubular shaft 38 or 42 to the countershaft extending therethrough.

In the forward direction low range, the tubular shaft 38 is frictionally secured to the countershaft 34 and in the reverse direction tubular shaft 42 is secured to countershaft 36. As previously stated, rotation of any one of the countershafts 24, 34, or 36 results, through connecting gears 62, 64 and 66, in the rotation of all countershafts. Engagement of speed ratio clutches 80, 52 or 82 transmits the rotation from the countershafts through the appropriate tubular shaft, spur gears and intermeshing gears to the tubular shaft 46 which in turn transmits the rotating motion to the exterior housing of clutch 52 and thence to output shaft 54.

For high range operation, low range directional clutch 76 and reverse directional clutch 78 are disengaged and high range directional clutch 18 is engaged. The engagement of high range clutch 18 transmits rotation from input shaft 14 through clutch 18 to countershaft 24. Connecting gears 64, 62 and 66 in turn transmit the rotation of countershaft 24 to the remaining countershafts 34 and 36. Upon engagement of the speed ratio clutches 80, 52 or 82, the motion is transmitted from the countershafts 24, 34 and 36 through the respective speed ratio gears and intermeshing gears to the external housing of clutch 52 and thence at a higher range to the output shaft 54.

The various clutch engagements required and the resulting power paths through the transmission for each direction and speed ratio are as follows:

Forward low range low speed:
  Clutches engaged 76 and 82.

Power from input shaft 14 is transmitted through the housing of clutch 18 to tubular shaft 22 and thence to spur gear 26. From spur gear 26 power is transmitted through the following gears, shafts and clutches: forward low range directional gear 58, tubular shaft 38, forward low range directional clutch 76, countershaft 34, connecting gears 62, 64, 66, to countershaft 36. Low speed clutch 82 frictionally engages countershaft 36 to tubular shaft 44, thereby transmitting power through spur gears 68 and 70 to tubular shaft 46 coaxially arranged on countershaft 24. From tubular shaft 46 power is transmitted through the housing of clutch 52, to output shaft 54 in low range low speed.

Forward low range intermediate speed:
  Clutches engaged 76 and 52.

Power is transmitted from input shaft 14, to the housing of clutch 18, tubular shaft 22, spur gear 26, directional spur gear 58, tubular shaft 38, forward low range clutch 76, countershaft 34, to connecting gears 62 and 64. Intermediate speed clutch 52 is engaged to frictionally engage the countershaft 24 to tubular shaft 46 and power is transmitted through the exterior housing of clutch 52 to output shaft 54 in low range intermediate speed.

Forward low range high speed:
  Clutches engaged 76 and 80.

Power is transmitted from input shaft 14, to the housing of clutch 18, tubular shaft 22, spur gear 26, forward directional gear 58, tubular shaft 38, forward low range directional clutch 76, countershaft 34, high speed ratio clutch 80, tubular shaft 40, spur gears 72 and 74, tubular shaft 46, the housing of clutch 52, to output shaft 54 at low range high speed.

Forward high range low speed:
  Clutches engaged 18 and 82.

Power is transmitted from input shaft 14, to the housing of clutch 18, tubular shaft 22, high range directional clutch 18, countershaft 24, connecting gears 64 and 66, countershaft 36, low speed ratio clutch 82, tubular shaft 44, spur gears 68 and 70, tubular shaft 46, the housing of clutch 52, to output shaft 54 at high range low speed.

Forward high range intermediate speed:
  Clutches engaged 18 and 52.

Power is transmitted from input shaft 14, to the housing of clutch 18, tubular shaft 22, forward high range clutch 18, countershaft 24, intermediate speed ratio clutch 52, tubular shaft 46, the housing of clutch 52, to output shaft 54 at high range intermediate speed.

Forward high range high speed:
  Clutches engaged 18 and 80.

Power is transmitted from input shaft 14, to the housing of clutch 18, tubular shaft 22, high range forward directional clutch 18, countershaft 24, connecting gears 64 and 62, countershaft 34, high speed ratio clutch 80, tubular shaft 40, spur gears 72 and 74, tubular shaft 46, the housing of clutch 52, to output shaft 54 at high range high speed.

Reverse low speed:
  Clutches engaged 78 and 82.

Power is transmitted from input shaft 14, to the housing of clutch 18, tubular shaft 22, spur gear 26, forward directional gear 58, tubular shaft 38, reverse idler gear 61, reverse directional gear 60, tubular shaft 42, reverse directional clutch 78, countershaft 36, low speed ratio clutch 82, tubular shaft 44, spur gears 68 and 70, tubular shaft 46, the housing of clutch 52, to output shaft 54 in reverse low speed.

Reverse intermediate speed:
  Clutches engaged 78 and 52.

Power is transmitted from input shaft 14, to the housing of clutch 18, tubular shaft 22, spur gear 26, forward directional gear 58, tubular shaft 38, reverse idler gear 61, reverse directional gear 60, tubular shaft 42, reverse directional clutch 78, countershaft 36, connecting gears 66 and 64, countershaft 24, intermediate speed ratio clutch 52, tubular shaft 46, the housing of clutch 52, to output shaft 54 in reverse intermediate speed.

Reverse high speed:
  Clutches engaged 78 and 80.

Power is transmitted from input shaft 14, clutch housing 18, tubular shaft 22, spur gear 26, forward directional gear 58, tubular shaft 38, reverse idler gear 61, reverse directional gear 60, tubular shaft 42, reverse directional clutch 78, countershaft 36, connecting gears 66, 64 and 62, countershaft 34, high speed ratio clutch 80, tubular shaft 40, spur gears 72 and 74, tubular shaft 46, the housing of clutch 52, to output shaft 54 in reverse high speed.

With this arrangement it is now possible to obtain six speeds in the forward direction. It should be noted that in fifth speed, or high range intermediate speed, the drive is straight through which mean spower enters through input shaft 14 and is transmitted through coaxial countershaft 24 and directly out through coaxial output shaft 54. With this arrangement in one of the speeds most often used in highway vehicles, we provide a substantially straight through drive with our transmission. The forward high range high speed, which is substantially an overdrive arrangement, may also be provided in our transmission. For example, the ratio in fifth speed due to direct connection between the input shaft 14 and output shaft 54 is 1:1. The ratio of the overdrive speed with one possible set of gear sizes would be in the vicinity of .70:1 which indicates that the output shaft is rotating at a higher speed than the input shaft.

EMBODIMENT OF FIGURES 4–9

*Six Forward and Three Reverse Speed Ratios*

FIGURES 4 through 9 show a second embodiment of our transmission which provides six speeds in the forward direction and three speeds in the reverse direction. In construction and operation, the embodiment of FIGURES 4–9 is generally similar to the embodiment of FIGURES 1–3. There are certain differences, however, in the construction of the two embodiments. The transmission housing of the embodiment of FIGURES 4–9 although divided into a range section, a connecting section, and a speed ratio section, does not have the clutch protective casings formed thereon as shown in the embodiment of FIGURES 1–3. Further, the hydraulically actuated friction clutches are of different construction as will become apparent as the description proceeds. Operationally, the embodiment of FIGURES 4–9 has a single large, heavy, forward directional spur gear 253 which functionally replaces the combination of a forward directional gear 58 and a reverse idler gear 61 that is shown in the embodiments of FIGURES 1–3.

Referring to FIGURES 4–9 which illustrate another embodiment of our invention, the details of construction of the transmission are shown in FIGURES 4–8 while the major components of the transmission are schematically represented in their relative positions in FIGURE 9. FIGURE 9 is arranged in reverse order from FIGURE 5 and is similar to FIGURE 3 of the previously described embodiment. The improved transmission mechanism generally designated by the numeral 210 has a housing 212 adapted to contain a lubricant bath. The housing 212 encloses the spur gears and shafts which revolve in the lubricant bath. A prime mover, not shown, drives a propeller shaft 214 which is connected to the exterior housing 216 of clutch 218 by means of a universal connection 220. The prime mover employed is preferably unidirectional so that the propeller shaft 214 and clutch housing 216 rotate in the same direction irrespective of the direction of rotation of the output shaft.

The clutch housing 216 is connected to a tubular shaft 222 that is coaxially positioned on a first countershaft 224 and is freely rotatable thereon. The term countershaft as employed in the specification and claims is intended to designate a shaft that is adapted to rotate in both directions. A spur gear 226 is nonrotatably secured to the tubular shaft 222 in any conventional manner for rotation therewith. The tubular shaft 222 is supported adjacent the clutch housing 216 by means of a roller bearing 228 and at its other end is supported in an aperture in the first inner wall 230 by means of roller bearings 232.

A pair of countershafts 234 and 236 are arranged within the housing 212 in spaced parallel relation to each other and to the countershaft 224. The countershafts 224, 234 and 236 are suitably journaled for rotation within the housing 212 and each has its end portions extending through the end walls of the housing 212. As illustrated in FIGURE 5, the shafts 24, 34 and 36 are of two piece construction to facilitate assembly of the transmission. Functionally, however, the shafts could be of one piece construction and not impair the operation of the transmission. The countershaft 234 has a pair of tubular shafts 238 and 240 arranged coaxially thereon in rotatable relation thereto. Similarly, the countershaft 236 also has a pair of tubular shafts 242 and 244 arranged coaxially thereon in rotatable relation thereto. Countershaft 224 has a second tubular shaft 246 arranged coaxially thereon in rotatable relation thereto. Each of the tubular shafts 238, 240, 242, 244, 222 and 246 has an end portion extending beyond an end wall of the housing 212. The end walls of the housing 212 have roller bearings 228 positioned therein to suitably support the respective tubular shafts. The housing 212 has a first inner wall 230 that divides the transmission range section from the transmission connecting section and a second inner wall 248 that divides the transmission connecting section from the speed ratio section and that also carries roller bearings 232 to rotatably support the respective tubular shafts.

The end portion of tubular shaft 246 that extends beyond the housing side wall is secured to the external housing 250 of the clutch 252. The housing 250 is connected to an output shaft 254 by means of a universal connection 256. Thus, the rotation of input shaft 214 is transmitted through the universal connection 220 to the external housing 216 of clutch 218, thence through the transmission 210 to the external housing 250 of clutch 252 and universal connection 256 to output shaft 254.

Forward directional spur gear 258 is nonrotatably secured to the tubular shaft 238 coaxially positioned on countershaft 234. The spur gear 226 secured to tubular shaft 222 on countershaft 224 is in meshing relation with spur gear 258. A reverse directional gear 260 is secured to the tubular shaft 242 that is coaxially positioned on countershaft 236. The reverse directional spur gear 260 is in meshing relation with forward directional spur gear 258 and the directional spur gears 258 and 260 are arranged to rotate in opposite directions.

The countershafts 234, 224 and 236 each has a connecting gear 262, 264 and 266 nonrotatably secured thereto for rotation therewith. The connecting gear 262 is in meshing relation with connecting gear 264 and connecting gear 266 is in meshing relation with connecting gear 264. With this arrangement, the actuation of any of the countershafts 234, 224, or 236 inherently actuates the remaining countershafts through the connecting gears 262, 264 and 266.

A low speed spur gear 268 is secured to the tubular shaft 244 and is rotatable therewith. The low speed spur gear 268 is in meshing relation with a spur gear 270 secured to the tubular shaft 246. A high speed spur gear 272 is secured to the tubular shaft 240 and is in meshing relation with the spur gear 274 that is also secured to the tubular shaft 246 that is coaxial with intermediate countershaft 224.

Arranged exteriorly of the housing 212 are the following clutches.

Directional clutches:
    276 Forward low range clutch which is arranged to frictionally engage tubular shaft 238 to countershaft 234.
    218 Forward high range clutch which is arranged to frictionally engage tubular shaft 222 to countershaft 224.
    278 Reverse low range clutch which is arranged to frictionally engage tubular shaft 242 to countershaft 236.

Change speed clutches:
    280 High speed clutch which is arranged to frictionally engage the tubular shaft 240 with countershaft 234.
    252 Intermediate speed clutch which is arranged to frictionally engage the tubular shaft 246 with the intermediate countershaft 224.
    282 Low speed clutch which is arranged to frictionally engage tubular shaft 244 with countershaft 236.

The above enumerated clutches are of the hydraulically operated multidisc type and are arranged exteriorly of the transmission housing for ready accessibility. For illustration, the high speed change speed clutch 280 is shown in section in FIGURE 5. Each clutch includes an inner member 284 keyed to the countershaft, which in the section illustrated is countershaft 234, and an outer rotatable clutch housing 286 secured to the tubular shaft 240. The inner member 284 and the housing or casing 286 carry interleaved clutch discs or plates 288 which when pressed together serve to frictionally engage the countershaft to the tubular shaft for rotation together. A piston 290 is received in a cylinder bore 292 formed within an end enclosure 294 of the outer rotatable clutch housing 286. The piston 290 has a clutch operating portion 296 which abuts the discs 288 and is adapted to move the discs into a clutch engaged position. The piston 290 is normally held in a retracted or clutch disengaged position by means of the springs 298 which act on the bolts 300. The cylinder end enclosure 294 has an element 302 of a conventional fluid swivel 304 connected therethrough, and an outer element 306 of the swivel is coupled to a fluid conduit. The fluid conduit and swivel coupling 304 is arranged to supply fluid under pressure to the cylinder bore 292. The fluid pressure moves the piston 290 until the clutch operating portion 286 moves the clutch discs 288 into frictional engagement. In the absence of fluid under pressure within the cylinder bore 292, the springs 298 retract the piston 290 and release the interleaved clutch discs 288.

The clutches 218 and 252 are similar in construction to remaining clutches 276, 280 and 282, however, fluid under pressure is fed internally to the cylinder bore in a well known manner. Again, the method of supplying fluid under pressure to the clutches 218 and 252 does not form a part of this invention. The above details of clutches 280 are set forth for illustrative purposes only. It should be understood that other types of clutches could be used with equal facility and the specific clutch construction does not form a part of this invention.

The transmission 210 is capable of providing six speeds in the forward direction and three speeds in the reverse direction. For clarity, reference may be had to the schematic FIGURE 9 as the various speed ratio conditions are described in detail. The rotation of input shaft 214 rotates the clutch housing 216 which in turn rotates the tubular shaft 222 that is nonrotatably connected thereto. The rotation of tubular shaft 222 is transmitted through spur gear 226 to forward and reverse directional gears 258 and 260. Engagement of either forward low range directional clutch 276 or reverse low range directional clutch 278 couples the respective tubular shaft 238 or 242 to the countershaft extending therethrough.

In the forward direction, the tubular shaft 238 is frictionally secured to countershaft 234 and in the reverse direction, tubular shaft 242 is secured to countershaft 236. As previously stated, energization of any of the countershafts 224, 234, and 236 results, through connecting gears 262, 264 and 266, in the energization of all countershafts in the proper direction. Engagement of speed ratio clutches 280, 252 or 282 transmits the rotating motion from the countershafts through the tubular shafts, spur gears and intermeshing gears to the tubular shaft 246 which in turn transmits the rotating motion to the exterior housing 250 of clutch 252 and thence through universal connection 256 to output shaft 254.

For high range operation, low range directional clutches 276 and 278 are disengaged and high range clutch 218 is engaged. The engagement of high range clutch 218 transmits rotation from input shaft 214 through clutch 218 to countershaft 224. Connecting gears 264, 262 and 266 in turn transmit the rotation of countershaft 224 to remaining countershafts 234 and 236. Upon engagement of the speed ratio clutches 280, 252 or 282, the motion is transmitted from the countershafts 224, 234, 236 through the respective change speed gears and intermeshing gears to the external housing 250 of clutch 252 and thence at a higher range to the output shaft 254.

The various clutch engagements required and the various gearing steps in the direction and speed ratios are as follows.

Forward low range low speed:
    Clutches engaged 276 and 282.

Power from input shaft 214 is transmitted through clutch housing 216 to tubular shaft 222 and thence to spur gear 226. From spur gear 226 power is transmitted through the following gears, shafts and clutches: forward low range directional gear 258; tubular shaft 238; forward low range directional clutch 276; countershaft 234; connecting gears 262, 264, 266, to countershaft 236. Low speed clutch 282 frictionally engages countershaft 236 to tubular shaft 244 thereby transmitting power through spur gears 268 and 270 to tubular shaft 246 coaxially arranged on countershaft 224. From tubular shaft 246 power is transmitted through clutch housing 250 to output shaft 254 in low range low speed.

Forward low range intermediate speed:
    Clutches engaged 276 and 252.

Power is transmitted from input shaft 214 to clutch housing 216, tubular shaft 222, spur gear 226, directional spur gear 258, tubular shaft 238, forward low range clutch 276, countershaft 234, to connecting gears 262 and 264. Intermediate speed clutch 252 is engaged to frictionally engage countershaft 224 to tubular shaft 246 as power is transmitted through the exterior housing 250 of clutch 252 to output shaft 254 in low range intermediate speed.

Forward low range high speed:
    Clutches engaged 276 and 280.

Power is transmitted from input shaft 214, to clutch housing 216, tubular shaft 222, spur gear 226, forward directional gear 258, tubular shaft 238, forward low range directional clutch 276, countershaft 234, high speed ratio clutch 280, tubular shaft 240, spur gears 272 and 274, tubular shaft 246, clutch housing 250, to output shaft 254 at low range high speed.

Forward high range low speed:
    Clutches engaged 218 and 282.

Power is transmitted from input shaft 214, to clutch housing 216, tubular shaft 222, high range directional clutch 218, countershaft 224, connecting gears 264 and 266, countershaft 236, low speed ratio clutch 282, tubular shaft 244, spur gears 268 and 270, tubular shaft 246, clutch housing 250, to output shaft 254 at high range low speed.

Forward high range intermediate speed:
    Clutches engaged 218 and 252.

Power is transmitted from input shaft 214, to clutch housing 216, tubular shaft 222, forward high range clutch 218, countershaft 224, intermediate speed ratio clutch 252, tubular shaft 246, clutch housing 250, to output shaft 254 at high range intermediate speed.

Forward high range high speed:
    Clutches engaged 218 and 280.

Power is transmitted from input shaft 214, to clutch housing 216, tubular shaft 222, high range forward directional clutch 218, countershaft 224, connecting gears 264 and 262, countershaft 234, high speed ratio clutch 280, tubular shaft 240, spur gears 272 and 274, tubular shaft 246, clutch housing 250, to output shaft 254 at high range high speed.

Reverse low speed:
    Clutches engaged 278 and 282.

Power is transmitted from input shaft 214, to clutch housing 216, tubular shaft 222, spur gear 226, forward directional gear 258, reverse directional gear 260, tubular shaft 242, reverse directional clutch 278, countershaft 236, low speed ratio clutch 282, tubular shaft 244, spur gears 268 and 270, tubular shaft 246, clutch housing 250, to output shaft 254 in reverse low speed.

Reverse intermediate speed:
    Clutches engaged 278 and 252.

Power is transmitted from input shaft 214, to clutch housing 216, tubular shaft 222, spur gear 226, forward directional gear 258, reverse directional gear 260, tubular shaft 242, reverse directional clutch 278, countershaft 236, connecting gears 266 and 264, countershaft 224, intermediate speed ratio clutch 252, tubular shaft 246, clutch housing 250, to output shaft 254 in reverse intermediate speed.

Reverse high speed:
    Clutches engaged 278 and 280.

Power is transmitted from input shaft 214, to clutch housing 216, tubular shaft 222, spur gear 226, forward directional gear 258, reverse directional gear 260, tubular shaft 242, reverse directional clutch 278, countershaft 236, connecting gears 266, 264 and 262, countershaft 234, high speed ratio clutch 280, tubular shaft 240, spur gears 272 and 274, tubular shaft 246, clutch housing 250, to output shaft 254 at reverse high speed.

With this arrangement, it is possible to obtain six speeds in the forward direction. It should be noted that in fifth speed, or high range intermediate speed, the drive is straight through, which means power enters through input shaft 214 and is transmitted through coaxial countershaft 224 and directly out through coaxial output shaft 254. With this arrangement in one of the speeds most often used in highway vehicles, we provide a substantially straight-through drive with our transmission. The forward high range high speed which is substantially an overdrive arrangement is also provided in our transmission.

EMBODIMENT OF FIGURES 10–12

*Nine Forward and Three Reverse Speed Ratios*

Referring to FIGURES 10, 11 and 12, a third embodiment of our transmission mechanism which provides nine speed ratio in the forward direction and three speed ratios in the reverse direction is indicated generally by the numeral 310. The constructional details of the transmission are shown in FIGURES 10 and 11 while the relative positions of the major transmission components are shown in schematic FIGURE 12 which is similar to FIGURE 10.

The transmission 310 has a housing 312 adapted to contain a lubricant bath. The housing 312 has a forward end wall 314 and a rear end wall 316. Immediately behind forward end wall 314 is located a transmission range section 318 in which are enclosed the range gears of the transmission mechanism. A first intermediate end wall 320 of housing 312 separates the range section 318 from a connecting section 322 in which are located the transmission connecting gears. A second intermediate wall 324 separates the connecting section 322 from the speed ratio section 326 located between the second intermediate wall 324 and rear end wall 316. The transmission speed ratio gears are located in the speed ratio section 326.

Rotatably supported in parallel spaced relation within the transmission housing 312 are countershafts 328, 330, 332 and 334. The countershafts 328, 332 and 334 each extend longitudinally through the transmission from forward of the transmission forward end wall 314 to behind the transmission rear end wall 316. Each of the countershafts 328, 332 and 334 are formed in two sections, 328a and 328b, 332a and 332b, and 334a and 334b respectively, to facilitate assembly of the transmission. Functionally, each of the countershafts 328, 332, and 334 could be formed as a unitary shaft. The countershaft 330 is only half as long as the other countershafts and extends from forward of the transmission forward end wall 314 into the transmission connecting section 322 behind the first intermediate wall 320.

A high range tubular shaft 336 is rotatably supported coaxially upon countershaft 328 within the range section 318 and extends forwardly through the forward end wall 314. A low range tubular shaft 338 is rotatably supported coaxially upon the countershaft 330 within range section 318 and extends forwardly through forward end wall 314. In a like manner, an intermediate tubular shaft 340 and a reverse tubular shaft 342 are rotatably supported coaxially upon countershafts 332 and 334 respectively and extend forwardly through the transmission forward end wall 314. Each of the tubular shafts 336, 338, 340 and 342 are rotatably supported within transmission forward end wall 314 by bearings 344 and are rotatably supported within the transmission first intermediate wall 320 by bearings 346.

The end of each countershaft 328, 330, 332, and 334 protruding forwardly through the transmission forward end wall 314 carries one element of a directional clutch assembly which may selectively engage the countershaft to the corresponding coaxial tubular shaft 336, 338, 340, or 342 which rotatably surrounds it. Thus, countershaft 328 is nonrotatably secured to the internal element of forward high range directional clutch 348 while tubular shaft 336 is nonrotatably secured to the external housing element of forward high range directional clutch 348. Forward high range directional clutch 348 is identical in construction to the modified clutch assembly 18 described in detail in connection with the embodiment of FIGURES 1–3. The forward high range directional clutch 348 nonrotatably receives the transmission input shaft 350 on its external element so that input shaft 350, and tubular shaft 336 are operationally a single unit.

In a like manner, countershaft 330 and forward low range tubular shaft 338 may be selectively engaged to each other by forward low range clutch 352. The forward intermediate range directional clutch 354 is adapted to selectively engage countershaft 332 to forward intermediate range tubular shaft 340. A reverse directional clutch 356 can selectively engage countershaft 334 to reverse tubular shaft 342. The clutches 352, 354, and 356 are identical in construction to the standard clutch 76 described in detail in connection with the embodiment of FIGURES 1–3. Each of the clutches 348, 352, 354 and 356 is disposed externally of the transmission housing 312 and forward of the transmission housing end wall 314. A protective directional clutch casing 358 is formed on transmission end wall 314 to protect the clutches during transmission operation. The directional clutch casing 358 has a modified clutch casing end plate 360 which covers forward high range directional clutch 348 and permits the transmission input shaft 350 to pass therethrough. Standard clutch casing end plates 362, 364 and 366 cover clutches 352, 354 and 356 respectively. The clutch casing end plates 360, 362, 364 and 366 permit access to the individual clutches for maintenance and repair.

Within the range section 318, a forward high range directional gear 368 is nonrotatably secured to forward high range tubular shaft 336. Also nonrotatably secured to tubular shaft 336 is a forward accessory drive gear 370 which may provide a power train to drive transmission accessories such as hydraulic pumps or the like. Forward high range directional gear 368 meshes with a forward intermediate range directional gear 372 that is nonrotatably secured to intermediate range tubular shaft 340. Also nonrotatably secured to shaft 340 is a reverse idler gear 374.

Reverse idler gear 374 meshes with a reverse directional gear 376 that is nonrotatably secured to tubular shaft 342. Also secured to tubular shaft 342 is a forward low range idler gear 378 that meshes with a forward low range directional gear 380 nonrotatably secured to the tubular shaft 338. The gears within the range section 318 provide a continuous drive train so that each of the tubular shafts 336, 338, 340 and 342 is rotated when transmission input shaft 350 is rotated. It will be seen that if the direction of rotation of input shaft 350 is designated as positive, tubular shaft 336 will be rotated in a positive direction. Tubular shaft 340 will be rotated in a negative direction by the meshing of gears 368 and 372. Tubular shaft 342 will be rotated in a positive direction by the meshing of gears 374 and 376. Tubular shaft 338 will be rotated in a negative direction by the meshing of gears 378 and 380.

Within the transmission connecting section 322, a connecting gear 382 is nonrotatably secured to countershaft 328 so that it axially joins countershaft sections 328a and 328b. A connecting gear 384 which meshes with connecting gear 382 is nonrotatably secured to countershaft 330. A connecting gear 386 is nonrotatably secured to countershaft 332 so that it axially joins the shaft sections 332a and 332b and gear 386 meshes with connecting gear 382. A connecting gear 388 meshes with connecting gear 382 and is nonrotatably secured to countershaft 334 so that it axially joins the shaft sections 334a and 334b. Each of the connecting gears 382, 384, 386, and 388 are rotatably supported within the first intermediate wall 320 by bearings 390 and are rotatably supported within the second intermediate wall 324 by bearings 392.

This construction also rotatably supports the respective countershafts within the intermediate walls since the respective connecting gears are nonrotatably secured to the countershafts. Since each of the countershafts 328, 330, 332 and 334 extends into the range section and through a coaxial tubular shaft within the range section, and since each of the utbular shaft shafts 336, 338, 340 and 342 rotate when the transmission input shaft 350 rotates, the rotation of input shaft 350 can be transmitted to the countershafts by engagement of any one of the directional clutches 348, 352, 354 or 356. The engagement of any one of the foregoing clutches causes all of the countershafts to rotate because of the meshing relation of the connecting gears 382, 384, 386 and 388 within the connecting section 322. The direction and speed at which the countershafts rotate is determined by which one of the clutches 348, 352, 354 or 356 is engaged.

The countershafts 328, 332 and 334 extend rearwardly through the transmission speed ratio section 326 and beyond the transmission housing rear end wall 316. Within the transmission speed ratio section 326, a first speed ratio tubular shaft 394 coaxially and rotatably surrounds countershaft 332. A second speed ratio tubular shaft 396 coaxially and rotatably surrounds countershaft 328. A third speed ratio tubular shaft 398 coaxially and rotatably surrounds countershaft 334. Each of the speed ratio tubular shafts 394, 396 and 398 is rotatably supported within second intermediate wall 324 by bearings 400 and is rotatably supported within the transmission rear end wall 316 by bearings 402.

Each of the tubular shafts 394, 396 and 398 extends rearwardly through the rear end wall 316 of the transmission and each of the shafts nonrotatably carries the external element of a clutch adapted to selectively engage the respective tubular shaft to its corresponding coaxial countershaft. Thus, a first speed ratio clutch 404 has its internal element nonrotatably secured to countershaft 332 and its external element nonrotatably secured to tubular shaft 394 so that upon engagement of clutch 404 countershaft 332 and tubular shaft 394 rotate together as a unit. First speed ratio clutch 404 is identical in construction to standard clutch 76 described in detail in connetcion with FIGURES 1 through 3.

A second speed ratio clutch 406 has its internal element nonrotatably secured to countershaft 328 and its external element nonrotatably secured to tubular shaft 396 so that upon engagement of clutch 406, tubular shaft 396 and countershaft 328 rotate together as a unit. The second speed ratio clutch 406 is identical in construction to the modified clutch 52 described in detail in connection with FIGURES 1 through 3 and has the transmission output shaft 408 nonrotatably secured to its external housing so that the transmission output shaft 408 operatively rotates as a unit with tubular shaft 396.

A third speed ratio clutch 410 has its internal element nonrotatably secured to countershaft 334 and its external element nonrotatably secured to the tubular shaft 398 so that upon engagement of clutch 410, tubular shaft 398 and countershaft 334 rotate together as a unit. Clutch 410 is identical in construction to the standard clutch 76 described in detail in connection with FIGURES 1 through 3.

The clutches 404, 406, and 410 are disposed externally of the transmission housing 312 behind rear end wall 316. A speed ratio clutch casing 412 is formed on transmission housing rear end wall 316 to protect clutches 404, 406 and 410 during operation of the transmission. A modified clutch casing end plate 414 covers clutch 406 and permits the transmission output shaft 408 to extend therethrough. Standard clutch casing end plates 416 and 418 cover clutches 404 and 410 respectively. The clutch casing end plates 414, 416, and 418 permit access to the clutches for maintenance and repair.

Within the transmission speed ratio section 326, a first speed ratio gear 420 is nonrotatably secured to first speed tubular shaft 394. Gear 420 meshes with a spur gear 422 nonrotatably secured to tubular shaft 396.

A third speed ratio gear 424 is nonrotatably secured to third speed tubular shaft 398 and meshes with another spur gear 426 nonrotatably secured to the tubular shaft 396. It will be noted that since tubular shaft 396 is operatively connected to the transmission output shaft 408 through the external housing of clutch 406, the spur gears 422 and 426 are, in effect, nonrotatably secured to the transmission output shaft 408.

The rotation of the input shaft 350 which is transmitted to the countershafts 328, 330, 332, and 334 through the engagement of one of the forward directional clutches 348, 352, 354 or the reverse clutch 356, is further transmitted from the countershafts to the transmission output shaft 408 by engagement of one of the speed ratio clutches 404 or 406 or 410.

For clarity, reference may be had to the schematic FIGURE 12 as the various speed ratio conditions of the transmission are described in detail. To effect the nine forward speeds and three reverse speeds of the transmission of FIGURES 10, 11 and 12, power is transmitted through the transmission in the following manner for each speed ratio.

Forward low range first speed:
  Clutches engaged 352 and 404.

Power is transmitted from input shaft 350 to tubular shaft 336, gear 368, gear 372, tubular shaft 340, gear 374, gear 376, tubular shaft 342, gear 378, gear 380, tubular shaft 338, clutch 352, countershaft 330, connecting gear 384, gear 382, gear 386, countershaft 332, clutch 404, tubular shaft 394, gear 420, gear 422, tubular shaft 396, to output shaft 408.

Forward low range second speed:
  Clutches engaged 352 and 406.

Power is transmitted from input shaft 350 to tubular shaft 336, gear 368, gear 372, tubular shaft 340, gear 374, gear 376, tubular shaft 342, gear 378, gear 380, tubular shaft 338, clutch 352, countershaft 330, gear 384, gear 382, countershaft 328, clutch 406, to output shaft 408.

Forward low range third speed:
  Clutches engaged 352 and 410.

Power is transmitted from input shaft 350 to tubular shaft 336, gear 368, gear 372, tubular shaft 340, gear 374, gear 376, tubular shaft 342, gear 378, gear 380, tubular shaft 338, clutch 352, countershaft 330, gear 384, gear 382, gear 388, countershaft 334, clutch 410, tubular shaft 398, gear 424, gear 426, tubular shaft 396, to output shaft 408.

Forward intermediate range first speed:
  Clutches engaged 354 and 404.

Power is transmitted from input shaft 350 to tubular shaft 336, gear 368, gear 372, tubular shaft 340, clutch 354, countershaft 332, clutch 404, tubular shaft 394, gear 420, gear 422, tubular shaft 396, to output shaft 408.

Forward intermediate range second speed:
  Clutches engaged 354 and 406.

Power is transmitted from input shaft 350 to tubular shaft 336, gear 368, gear 372, tubular shaft 340, clutch 354, countershaft 332, gear 386, gear 382, countershaft 328, clutch 406, to output shaft 408.

Forward intermediate range third speed:
  Clutches engaged 354 and 410.

Power is transmitted from input shaft 350, tubular shaft 336, gear 368, gear 372, tubular shaft 340, clutch 354, countershaft 332, gear 386, gear 382, gear 388, countershaft 334, clutch 410, tubular shaft 398, gear 424, gear 426, tubular shaft 396, to output shaft 408.

Forward high range first speed:
  Clutches engaged 348 and 404.

Power is transmitted from input shaft 350, to clutch 348, countershaft 328, gear 382, gear 386, countershaft 332, clutch 404, tubular shaft 394, gear 420, gear 422, tubular shaft 396, to output shaft 408.

Forward high range second speed:
  Clutches engaged 348 and 406.

Power is transmitted from input shaft 350 to clutch 348, countershaft 328, clutch 406, to output shaft 408.

Forward high range third speed:
  Clutches engaged 348 and 410.

Power is transmitted from input shaft 350 to clutch 348, countershaft 328, gear 382, gear 388, countershaft 334, clutch 410, tubular shaft 398, gear 424, gear 426, tubular shaft 396, to output shaft 408.

Reverse first speed:
  Clutches engaged 356 and 404.

Power is transmitted from input shaft 350, to tubular shaft 336, gear 368, gear 372, tubular shaft 340, gear 374, gear 376, tubular shaft 342, clutch 356, countershaft 334, gear 388, gear 382, gear 386, countershaft 332, clutch 404, tubular shaft 394, gear 420, gear 422, tubular shaft 396, to output shaft 408.

Reverse second speed:
  Clutches engaged 356 and 406.

Power is transmitted from input shaft 350, to tubular shaft 336, gear 368, gear 372, tubular shaft 340, gear 374, gear 376, tubular shaft 342, clutch 356, countershaft 334, gear 388, gear 382, countershaft 328, clutch 406, to output shaft 408.

Reverse third speed:
  Clutches engaged 356 and 410.

Power is transmitted from input shaft 350, to tubular shaft 336, gear 368, gear 372, tubular shaft 340, gear 374, gear 376, tubular shaft 342, clutch 356, countershaft 334, clutch 410, tubular shaft 398, gear 424, gear 426, tubular shaft 396, to output shaft 408.

EMBODIMENT OF FIGURES 13–16

*Twelve Forward and Four Reverse Speed Ratios*

Referring to FIGURES 13, 14, 15 and 16, a fourth embodiment of our transmission mechanism, which provides twelve speed ratios in the forward direction and four speed ratios in the reverse direction, is indicated generally by the numeral 510. The constructional details of the transmission are shown in FIGURES 13–15, while the general arrangement of the major components is shown schematically in FIGURE 16 which is similar to FIGURE 13.

The transmission 510 has a housing 512 adapted to contain a lubricant bath. The housing 512 has a forward end wall 514 and a rear end wall 516. Immediately behind forward end wall 514 is located a transmission range section 518 in which are enclosed the range gears of the transmission mechanism. A first intermediate end wall 520 of housing 512 separates the range section 518 from a connecting section 522 in which are located the transmission connecting gears. A second intermediate wall 524 separates the connecting section 522 from the speed ratio section 526 located between the second intermediate wall 524 and the rear end wall 516. The transmission speed ratio gears are located in the speed ratio section 526.

Rotatably supported in parallel spaced relation within the transmission housing 512 are countershafts 528, 530, 532, and 534. The countershafts 528, 530, 532 and 534 each extend longitudinally through the transmission from forward of the transmission forward end wall 514 to behind the transmission rear end wall 516. Each of the countershafts 528, 530, 532, and 534 are formed in two sections, 528a and 528b, 530a and 530b, 532a and 532b, and 534a and 534b respectively, to facilitate assembly of the transmission. Functionally, each of the countershafts 528, 530, and 534 could be formed as a unitary shaft.

A high range tubular shaft 536 is rotatably supported coaxially upon countershaft 528 within the range section 518 and extends forwardly through the forward end wall 514. A low range tubular shaft 538 is rotatably supported coaxially upon the countershaft 530 within range section 518 and extends forwardly through forward end wall 514. In a like manner, an intermediate tubular shaft 540 and a reverse tubular shaft 542 are rotatably supported coaxially upon countershafts 532 and 534 respectively and extend forwardly through the transmission forward end wall 514. Each of the tubular shafts 536, 538, 540 and 542 are rotatably supported within transmission forward end wall 514 by bearings 544 and are rotatably supported within the transmission first intermediate wall 520 by bearings 546.

The end of each countershaft 528, 530, 532, and 534 protruding forwardly through the transmission forward end wall 514 carries one element of a clutch assembly which may selectively engage the respective countershaft to the corresponding coaxial tubular shaft 536, 538, 540, or 542 which rotatably surrounds it. Thus, countershaft 528 is nonrotatably secured to the internal element of forward high range directional clutch 548 while tubular shaft 536 is nonrotatably secured to the external housing element of forward high range directional clutch 548. Forward high range directional clutch 548 is identical in construction to the modified clutch assembly 18 described in detail in connection with the embodiment of FIGURES 1–3. The forward high range directional clutch 548 nonrotatably receives the transmission input shaft 550 on its external element so that input shaft 550, and tubular shaft 536 are operationally a single unit.

In a like manner, countershaft 530 and forward low range tubular shaft 538 may be selectively engaged to each other by forward low range directional clutch 552. The forward intermediate range directional clutch 554 is adapted to selectively engage countershaft 532 to forward intermediate range tubular shaft 540. A reverse directional clutch 556 can selectively engage countershaft 534 to reverse tubular shaft 542. The clutches 552, 554 and 556 are identical in construction to the standard clutch 76 described in detail in connection with the embodiment of FIGURES 1–3.

Each of the directional clutches 548, 552, 554, and 556 is disposed externally of the transmission housing 512 and forward of the transmission housing end wall 514. A protective directional clutch casing 558 is formed on transmission end wall 514 to protect the clutches during transmission operation. The directional clutch casing 558 has a modified clutch casing end plate 560 which covers forward high range directional clutch 548 and permits the transmission input shaft 550 to pass therethrough. Standard clutch casing end plates 562, 564, and 566 cover clutches 552, 554 and 556 respectively. The clutch casing end plates 560, 562, 564 and 566 permit access to the individual clutches for maintenance and repair.

Within the range section 518, a forward high range directional gear 568 is nonrotatably secured to forward high range tubular shaft 536. Also nonrotatably secured to tubular shaft 536 is a forward accessory drive gear 570 which may provide a power train to drive transmission accessories such as hydraulic pumps or the like. Forward high range directional gear 568 meshes with a forward intermediate range directional gear 572 that is nonrotatably secured to intermediate range tubular shaft 540. Also nonrotatably secured to shaft 540 is a reverse idler gear 574.

Reverse idler gear 574 meshes with a reverse directional gear 576 that is nonrotatably secured to tubular shaft 542. Also nonrotatably secured to tubular shaft 542 is a forward low range idler gear 578 that meshes with a forward low range directional gear 580 nonrotatably secured to the tubular shaft 538. The gears within the range section 518 provide a continuous drive train so that each of the tubular shafts 536, 538, 540, and 542 is rotated when transmission input shaft 550 is rotated. It will be seen that if the direction of rotation of input shaft 550 is designated as positive, tubular shaft 536 will be rotated in a positive direction. Tubular shaft 540 will be rotated in a negative direction by the meshing of gears 568 and 572. Tubular shaft 542 will be rotated in a positive direction by the meshing of gears 574 and 576. Tubular shaft 538 will be rotated in a negative direction by the meshing of gears 578 and 580.

Within the transmission connecting section 522, a connecting gear 582 is nonrotatably secured to countershaft 528 so that it axially joins countershaft sections 528a and 528b. A connecting gear 584 which meshes with connecting gear 582 is nonrotatably secured to countershaft 530 so that it axially joins countershaft sections 530a and 530b. A connecting gear 586 is nonrotatably secured to countershaft 532 so that it axially joins the shaft sections 532a and 532b and gear 586 meshes with connecting gear 582. A connecting gear 588 meshes with connecting gear 582 and is nonrotatably secured to countershaft 534 so that it axially joins the shaft sections 534a and 534b. The meshing arrangement of connecting gears 582, 584, 586 and 588 is clearly shown in FIGURE 15. It should be noted that the connecting section 522 of the embodiment of FIGURES 13–16 is identical to connecting section 322 of the embodiment of FIGURES 10–12 and that reference may be had to FIGURE 15 for details of the connecting section 322 by subtracting 200 from each of the reference numerals on FIGURE 15. Each of the connecting gears 582, 584, 586 and 588 are rotatably supported within the first intermediate end wall 520 by bearings 590 and are rotatably supported within the second intermediate end wall 524 by bearings 592.

This construction also rotatably supports the respective countershafts within the intermediate walls since the respective connecting gears are nonrotatably secured to the countershafts. Each of the countershafts 528, 530, 532 and 534 extends into the range section and through a coaxial range tubular shaft within the range section, and since each of the range tubular shafts 536, 538, 540 and 542 rotate when the transmission input shaft 550 rotates, the rotation of input shaft 550 can be transmitted to the countershafts by engagement of any one of the directional clutches 548, 552, 554, or 556. The engagement of any one of the foregoing directional clutches causes all the countershafts to rotate because of the meshing relation of the connecting gears 582, 584, 586, and 588 within the connecting section 522. The direction and speed at which the countershafts rotate is determined by which one of the clutches 548, 552, 554, or 556 is engaged.

The countershafts 528, 530, 532 and 534 extend rearwardly through the transmission speed ratio section 526 and beyond transmission housing end wall 516. Within the transmission speed ratio section 526, a first speed ratio tubular shaft 594 coaxially and rotatably surrounds countershaft 532. A second speed ratio tubular shaft 596 coaxially and rotatably surrounds countershaft 530. A third speed ratio tubular shaft 598 coaxially and rotatably surrounds countershaft 528. A fourth speed ratio tubular shaft 600 coaxially and rotatably surrounds countershaft 534. Each of the speed ratio tubular shafts 594, 596, 598, and 600 is rotatably supported within second intermediate wall 524 by bearings 602 and is rotatably supported within the transmission rear end wall 516 by bearings 604.

Each of the speed ratio tubular shafts 594, 596, 598, and 600 extends rearwardly through the rear end wall 516 of the transmission and each of the shafts nonrotatably carries the external element of a clutch adapted to selectively engage the respective tubular shaft to its corresponding coaxial countershaft. Thus, a first speed ratio clutch 606 has its internal elements nonrotatably secured to countershaft 532 and its external elements nonrotatably secured to tubular shaft 594 so that upon engagement of clutch 606, countershaft 532 and tubular shaft 594 rotate together as a unit. First speed ratio clutch 606 is identical in construction to standard clutch 76 described in detail in connection with FIGURES 1–3.

A second speed ratio clutch 608 has its internal element nonrotatably secured to countershaft 530 and its external element nonrotatably secured to tubular shaft 596 so that upon engagement of clutch 608, tubular shaft 596 and countershaft 530 rotate together as a unit. The second speed ratio clutch 608 is identical in construction to standard clutch 76 described in detail in connection with FIGURES 1–3.

A third speed ratio clutch 610 has its internal element nonrotatably secured to countershaft 528 and its external element nonrotatably secured to tubular shaft 598 to that upon engagement of clutch 610, tubular shaft 598 and countershaft 528 ratate together as a unit. The third speed ratio clutch 610 is identical in construction to the modified clutch 52 described in detail in connection with FIGURES 1–3 and has the transmission output shaft 612 nonrotatably secured to its external housing so that the transmission output shaft 612 operatively rotates as a unit with tubular shaft 598.

A fourth speed ratio clutch 614 has its internal element nonrotatably secured to countershaft 534 and its external element nonrotatably secured to the tubular shaft 600 so that upon engagement of clutch 614, tubular shaft 600 and countershaft 534 rotate together as a unit. Clutch 614 is identical in construction to the standard clutch 76 described in detail in connection with FIGURES 1–3.

The clutches 606, 608, 610, and 614 are disposed externally of the transmission housing 512 behind rear end wall 516. A speed ratio clutch casing 616 is formed on transmission housing rear end wall 516 to protect clutches 606, 608, 610, and 614 during operation of the transmission. A modified clutch casing end plate 618 covers clutch 610 and permits the transmission output shaft 612 to extend therethrough. Standard clutch casing end plates 620, 622, and 624 cover clutches 606, 608, and 614 respectively. The clutch casing end plates 618, 620, 622 and 624 permit access to the clutches for maintenance and repair.

Within the transmission speed ratio section 526, a first speed ratio gear 626 is nonrotatably secured to first speed tubular shaft 594. Gear 626 meshes with a spur gear 628 nonrotatably secured to tubular shaft 598.

A second speed ratio gear 630 is nonrotatably secured to second speed tubular shaft 596 and meshes with another spur gear 632 nonrotatably secured to the tubular shaft 598. A fourth speed ratio gear 634 is nonrotatably secured to fourth speed ratio tubular shaft 600 and meshes with still another spur gear 636 nonrotatably secured to the tubular shaft 598.

Also nonrotatably secured to the tubular shaft 598 is a rear accessory drive gear 638 which may be utilized to drive a hydraulic pump or the like. It will be noted that since tubular shaft 598 is operatively connected to the transmission output shaft 612 through the external housing of clutch 610, the spur gears 628, 632, and 636 and the accessory drive gear 638 are, in effect, nonrotatably secured to the transmission output shaft.

The rotation of the input shaft 550, which is transmitted to the power shafts 528, 530, 532, and 534 through the engagement of one of the forward directional clutches 548, 552, 554, or the reverse directional clutch 556, is further transmitted from the countershafts to the transmission output shaft 612 by engagement of one of the speed ratio clutches 606, 608, 610 or 614.

For clarity, reference may be had to the schematic FIGURE 16 as the various speed ratio conditions of the transmission are described in detail. To effect the twelve forward speeds and four reverse speeds of the transmission of FIGURES 13–16, power is transmitted through the transmission in the following manner for each speed.

Forward low range first speed:
    Clutches engaged 552 and 606.

Power is transmitted from input shaft 550 to tubular shaft 536, gear 568, gear 572, tubular shaft 540, gear 574, gear 576, tubular shaft 542, gear 578, gear 580, tubular shaft 538, clutch 552, countershaft 530, connecting gear 584, gear 582, gear 586, countershaft 532, clutch 606, tubular shaft 594, gear 626, gear 628, tubular shaft 598, to output shaft 612.

Forward low range second speed:
Clutches engaged 552 and 608.

Power is transmitted from input shaft 550 to tubular shaft 536, gear 568, gear 572, tubular shaft 540, gear 574, gear 576, tubular shaft 542, gear 578, gear 580, tubular shaft 538, clutch 552, countershaft 530, gear 584, countershaft 530, clutch 608, tubular shaft 596, gear 630, gear 632, tubular shaft 598, to output shaft 612.

Forward low range third speed:
Clutches engaged 552 and 610.

Power is transmitted from input shaft 550 to tubular shaft 536, gear 568, gear 572, tubular shaft 540, gear 574, gear 576, tubular shaft 542, gear 578, gear 580, tubular shaft 538, clutch 552, countershaft 530, gear 584, gear 582, countershaft 528, clutch 610, to output shaft 612.

Forward low range fourth speed:
Clutches engaged 552 and 614.

Power is transmitted from input shaft 552 to tubular shaft 536, gear 568, gear 572, tubular shaft 540, gear 574, gear 576, tubular shaft 542, gear 578, gear 580, tubular shaft 538, clutch 552, countershaft 530, gear 584, gear 582, gear 588, countershaft 534, clutch 614, tubular shaft 600, gear 634, gear 636, tubular shaft 598, to output shaft 612.

Forward intermediate range first speed:
Clutches engaged 554 and 606.

Power is transmitted from input shaft 550 to tubular shaft 536, gear 568, gear 572, tubular shaft 540, clutch 554, countershaft 532, clutch 606, tubular shaft 594, gear 626, gear 628, tubular shaft 598, to output shaft 612.

Forward intermediate range second speed:
Clutches engaged 554 and 608.

Power is transmitted from input shaft 550 to tubular shaft 536, gear 568, gear 572, tubular shaft 540, clutch 554, countershaft 532, gear 586, gear 582, gear 584, countershaft 530, clutch 608, tubular shaft 596, gear 630, gear 632, tubular shaft 598, to output shaft 612.

Forward intermediate range third speed:
Clutches engaged 554 and 610.

Power is transmitted from input shaft 550, to tubular shaft 536, gear 568, gear 572, tubular shaft 540, clutch 554, countershaft 532, gear 586, gear 582, countershaft 528, clutch 610, to output shaft 612.

Forward intermediate range fourth speed:
Clutches engaged 554 and 614.

Power is transmitted from input shaft 550, to tubular shaft 536, gear 568, gear 572, tubular shaft 540, clutch 554, countershaft 532, gear 586, gear 582, gear 588, countershaft 534, clutch 614, tubular shaft 600, gear 634, gear 636, tubular shaft 598, to output shaft 612.

Forward high range first speed:
Clutches engaged 548 and 606.

Power is transmitted from input shaft 550 to clutch 548, countershaft 528, gear 582, gear 586, countershaft 532, clutch 606, tubular shaft 594, gear 626, gear 628, tubular shaft 598, to output shaft 612.

Forward high range second speed:
Clutches engaged 548 and 608.

Power is transmitted from input shaft 550 to clutch 548, countershaft 528, gear 582, gear 584, countershaft 530, clutch 608, tubular shaft 596, gear 630, gear 632, tubular shaft 598, to output shaft 612.

Forward high range third speed:
Clutches engaged 548 and 610.

Power is transmitted from input shaft 550 to clutch 548, countershaft 528, clutch 610, to output shaft 612.

Forward high range fourth speed:
Clutches engaged 548 and 614.

Power is transmitted from input shaft 550 to clutch 548, countershaft 528, gear 582, gear 588, countershaft 534, clutch 614, tubular shaft 600, gear 634, gear 636, tubular shaft 598, to output shaft 612.

Reverse first speed:
Clutches engaged 556 and 606.

Power is transmitted from input shaft 550 to tubular shaft 536, gear 568, gear 572, tubular shaft 540, gear 574, gear 576, tubular shaft 542, clutch 556, countershaft 534, gear 588, gear 582, gear 586, countershaft 532, clutch 606, tubular shaft 594, gear 626, gear 628, tubular shaft 598, to output shaft 612.

Reverse second speed:
Clutches engaged 556 and 608.

Power is transmitted from input shaft 550 to tubular shaft 536, gear 568, gear 572, tubular shaft 540, gear 574, gear 576, tubular shaft 542, clutch 556, countershaft 534, gear 588, gear 582, gear 584, countershaft 530, clutch 608, tubular shaft 596, gear 630, gear 632, tubular shaft 598, to output shaft 612.

Reverse third speed:
Clutches engaged 556 and 610.

Power is transmitted from input shaft 550, to tubular shaft 536, gear 568, gear 572, tubular shaft 540, gear 574, gear 576, tubular shaft 542, clutch 556, countershaft 534, gear 588, gear 582, countershaft 528, clutch 610, to output shaft 612.

Reverse fourth speed:
Clutches engaged 556 and 614.

Power is transmitted from input shaft 550 to tubular shaft 536, gear 568, gear 572, tubular shaft 540, gear 574, gear 576, tubular shaft 542, clutch 556, countershaft 534, clutch 614, tubular shaft 600, gear 634, gear 636, tubular shaft 598, to output shaft 612.

In each of the above described embodiments, it will be seen that the transmission housing is divided longitudinally into a range section, a connecting section, and a speed ratio section. The constantly meshing gears within the range section provide rotation to each of the range tubular shafts when the transmission input shaft is rotated. The rotation of the range tubular shafts is transmitted to the longitudinally extending countershafts by engagement of any one of the directional clutches. The longitudinally extending countershafts are interconnected by constant mesh gearing within the connecting section of the transmission so that when rotation is impressed upon any one of the countershafts by engagement of a directional clutch, all of the countershafts are rotated. The rotation of the countershafts is transmitted through the speed ratio gearing within the transmission speed ratio section to the transmission output shaft by engagement of any one of the speed ratio clutches. The speed ratio gearing provides a constantly meshing gear train with the transmission output shaft so that each of the speed ratio tubular shafts rotates when any one of the speed ratio clutches is engaged.

The flexibility of manufacture of the transmission mechanism of the present invention can be noted from a comparison of the above described embodiments of the transmission. For example, when comparing the nine speed embodiment of FIGURES 10–12 with the twelve speed embodiment of FIGURES 13–16, it will be seen that the range sections and connecting sections of these transmission embodiments are substantially identical. In the nine speed embodiment, the speed ratio section has a fewer number of countershafts, tubular shafts and gears than has the speed ratio section of the twelve speed transmission. Thus, a basic range and connecting section can be combined with one of two speed ratio sections to provide a transmission having nine forward and three reverse speeds, or to provide a transmission having twelve forward and four reverse speeds. Similarly, it will be noted from a comparison of the embodiments of FIGURES 1–3 and the embodiment of FIGURES 4–9 that the connecting section and speed ratio section of these two transmissions are arranged in a similar manner. The range sections of these transmissions differ in that a single heavy gear 258 is utilized on the forward low range tubular shaft of the embodiment of FIGURES 4–9 whereas two lighter, different sized gears 58 and 61 are utilized on the forward low range tubular shaft of the embodiment of FIGURES 1–3. The gear sizes can thus be varied to provide different range ratios for the transmissions.

It should be noted that the particular arrangements described in detail in the foregoing description are exemplary only and that many other arrangements may be utilized without departing from the scope of the invention. The speed ratio clutches have been arbitrarily designated first, second and third in the six and nine speed embodiments and first, second, third and fourth speeds in the twelve speed embodiment. If the gear sizes within the transmission speed ratio sections or within the range sections are varied appreciably, the order of engagement of the clutches to produce progressively higher speed ratios may be varied. Accordingly, the designation of forward low range, forward intermediate range, and forward high range and the designation of first, second, third and fourth speeds for the various clutches of the transmission are exemplary only and the relative positions of the various clutches may vary with other embodiments of the transmission.

According to the provisions of the patent statutes, we have explained the principle, preferred construction and mode of operation of our invention and have illustrated and described what we now consider to represent its best embodiments. However, we desire to have it understood that, within the scope of the appended claims, the invention may be practiced otherwise than as specifically illustrated and described.

We claim:

1. A constant mesh transmission comprising a housing including a range section and a connecting section, a plurality of shafts journaled for rotation relative to said housing in parallel spaced relation to each other, each of said shafts extending through said range and connecting sections, a connecting gear nonrotatably secured to each of said shafts, a constantly meshing connecting gear train formed of only said connecting gears arranged so that said shafts rotate upon rotation of any one shaft, said connecting gear train positioned within said housing connecting section, a constantly meshing range gear train disposed within said housing range section for providing a plurality of speeds in one direction, transmission input means to drive said range gear train, and means including clutch means adapted to selectively and operatively engage each of said shafts to said input means through said range gear train to thereby rotate said shafts.

2. In a constant mesh transmission having a plurality of speeds in both directions the combination comprising a housing, three countershafts journaled in said housing, gearing connecting said countershafts to each other, directional gearing coaxially mounted on certain of said countershafts, said directional gearing arranged in rotatable relation relative to said countershaft extending coaxially therethrough, directional clutches arranged to selectively connect said respective directional gearing to said countershaft extending therethrough so that said respective countershaft rotates with said respective directional gearing, said gearing connecting said countershafts, and said directional clutches arranged to transmit motion from said directional gearing to all of said countershafts, and means to rotate said directional gearing.

3. In a constant mesh transmission the combination comprising a housing, three countershafts journaled in said housing in parallel relation to each other, each of said countershafts having a spur gear nonrotatably secured thereto, said spur gears arranged to drivingly connect said countershafts to each other, directional gears coaxially mounted on certain of said countershafts, said directional gears being rotatable relative to said respective countershafts extending therethrough, directional clutches arranged to selectively connect said respective directional gear to said respective countershaft extending therethrough for rotation therewith so that motion is transmitted from said directional gear through said directional clutch to all of said countershafts, and means to rotate said directional gears.

4. In a constant mesh transmission the combination comprising a housing, three countershafts journaled in said housing in parallel spaced relation to each other, each of said countershafts having a spur gear nonrotatably secured thereto, said spur gears arranged to drivingly connect said countershafts to each other, each of said countershafts having a tubular shaft arranged coaxially thereon in rotatable relation thereto, gearing connecting said tubular shafts, input means to drive said gearing, and directional clutches arranged to selectively connect said respective tubular shaft to said countershaft extending therethrough for rotation therewith so that motion is selectively transmitted from said respective tubular shaft through said respective directional clutch to all of said countershafts.

5. In a constant mesh transmission the combination comprising a housing, three countershafts journaled in said housing in parallel relation to each other, each of said countershafts having a spur gear nonrotatably secured thereto, said spur gears arranged to drivingly connect said countershafts to each other, directional gears coaxially mounted on certain of said countershafts, said directional gears being rotatable relative to said respective countershafts extending therethrough, directional clutches arranged to selectively connect said respective directional gear to said respective countershaft extending coaxially therethrough for rotation therewith so that motion is transmitted from said directional gear through said directional clutch to all of said countershafts, one of said directional clutches positioned exteriorly of said housing, said last named directional clutch having a housing portion rotatable relative to said respective countershaft and drivingly connected to said directional gears, and input means connected to said last named directional clutch housing portion.

6. In a constant mesh transmission the combination comprising a housing, a first countershaft, a second countershaft, and a third countershaft, all of said countershafts arranged in spaced parallel relation to each other, a first connecting gear nonrotatably secured to said first countershaft, a second connecting gear nonrotatably secured to said second countershaft and meshing with said first connecting gear, a third connecting gear nonrotatably secured to said third countershaft and meshing with said first connecting gear, a first range tubular shaft coaxially positioned on said first countershaft in rotatable relation thereto, a second range tubular shaft coaxially positioned on said second countershaft in rotatable relation thereto, a third range tubular shaft coaxially positioned on said third countershaft in rotatable relation thereto, a first range gear nonrotatably secured to said first range tubular shaft, a second range gear nonrotatably secured to said second range tubular shaft and meshing with said first range gear, a third range gear nonrotatably secured to said second range tubular shaft, a fourth range gear nonrotatably secured to said third range tubular shaft and meshing with said third range gear, a first directional clutch adapted to engage said first range tubular shaft to said first countershaft, a second directional clutch adapted to engage said second range tubular shaft to said second countershaft, a third directional clutch adapted to engage said third range tubular shaft to said third countershaft, transmission input means operatively connected to one of said range tubular shafts to rotate said range tubular shafts, said first directional clutch adapted upon engagement to rotate said countershafts in given directions at first predetermined speeds, said second directional clutch adapted upon engagement to rotate said countershafts in said given directions at second predetermined speeds, and said third directional clutch adapted upon engagement to rotate said countershafts in directions opposite to said given directions at a predetermined speed.

7. In a constant mesh transmission the combination comprising a housing, a first countershaft, a second countershaft, and a third countershaft, all of said countershafts arranged in spaced parallel relation to each other, a first connecting gear nonrotatably secured to said first countershaft, a second connecting gear nonrotatably secured to said second countershaft and meshing with said first connecting gear, a third connecting gear nonrotatably secured to said third countershaft and meshing with said first connecting gear, a first range tubular shaft coaxially positioned on said first countershaft in rotatable relation thereto, a second range tubular shaft coaxially positioned on said second countershaft in rotatable relation thereto, a third range tubular shaft coaxially positioned on said third countershaft in rotatable relation thereto, a first range gear nonrotatably secured to said first range tubular shaft, a second range gear nonrotatably secured to said second range tubular shaft and meshing with said first range gear, a third range gear nonrotatably secured to said third range tubular shaft and meshing with said second range gear, a first directional clutch adapted to engage said first range tubular shaft to said first countershaft, a second directional clutch adapted to engage said second range tubular shaft to said second countershaft, a third directional clutch adapted to engage said third range tubular shaft to said third countershaft, transmission input means operatively connected to one of said range tubular shafts to rotate said range tubular shafts, said first directional clutch adapted upon engagement to rotate said countershafts in given directions at a first predetermined speed, said second directional clutch adapted upon engagement to rotate said countershafts in said given directions at a second predetermined speed, and said third directional clutch adapted upon engagement to rotate said countershafts in directions opposite to said given directions at a predetermined speed.

8. In a constant mesh transmission the combination comprising a housing, a first countershaft, a second countershaft, a third countershaft, and a fourth countershaft, all of said countershafts arranged in spaced parallel relation to each other, a first connecting gear nonrotatably secured to said first countershaft, a second connecting gear nonrotatably secured to said second countershaft and meshing with said first connecting gear, a third connecting gear nonrotatably secured to said third countershaft and meshing with said first connecting gear, a fourth connecting gear nonrotatably secured to said fourth countershaft and meshing with said first connecting gear, a first range tubular shaft coaxially positioned on said first countershaft in rotatable relation thereto, a second range tubular shaft coaxially positioned on said second countershaft in rotatable relation thereto, a third range tubular shaft coaxially positioned on said third countershaft in rotatable relation thereto, a fourth range tubular shaft coaxially positioned on said fourth countershaft in rotatable relation thereto, a first range gear nonrotatably secured to said first range tubular shaft, a second range gear nonrotatably secured to said second range tubular shaft and meshing with said first range gear, a third range gear nonrotatably secured to said second range tubular shaft, a fourth range gear nonrotatably secured to said third range tubular shaft and meshing with said third range gear, a fifth range gear nonrotatably secured to said third range tubular shaft, a sixth range gear nonrotatably secured to said fourth range tubular shaft and meshing with said fifth range gear, a first directional clutch adapted to engage said first range tubular shaft to said first countershaft, a second directional clutch adapted to engage said second range tubular shaft to said second countershaft, a third directional clutch adapted to engage said third range tubular shaft to said third countershaft, a fourth directional clutch adapted to engage said fourth range tubular shaft to said fourth countershaft, transmission input means operatively connected to one of said range tubular shafts to rotate said range tubular shafts, said first directional clutch adapted upon engagement to rotate said countershafts in given directions at first predetermined speeds, said second directional clutch adapted upon engagement to rotate said countershafts in said given directions at second predetermined speeds, said fourth directional clutch adapted upon engagement to rotate said countershafts in said given directions at third predetermined speeds, and said third directional clutch adapted upon engagement to rotate said countershafts in directions opposite to said given directions at a predetermined speed.

9. A constant mesh transmission comprising a housing including a connecting section and a speed ratio section, a plurality of shafts journaled for rotation relative to said housing in parallel spaced relation to each other, each of said shafts extending through said connecting and speed ratio sections, a connecting gear nonrotatably secured to each of said shafts, a constantly meshing connecting gear train formed of only said connecting gears arranged so that said shafts rotate upon rotation of any one shaft, said connecting gear train positioned within said housing connecting section, means to drive said shafts, a constantly meshing speed ratio gear train disposed within said housing speed ratio section, transmission output means driven by said speed ratio gear train, and means including speed ratio clutch means to selectively and operatively engage each of said shafts to said speed ratio gear train.

10. In a constant mesh transmission the combination comprising a housing, a first countershaft, a second countershaft, and a third countershaft, all of said countershafts arranged in spaced parallel relation to each other, a first connecting gear nonrotatably secured to said first countershaft, a second connecting gear nonrotatably secured to said second countershaft and meshing with said first connecting gear, a third connecting gear nonrotatably secured to said third countershaft and meshing with said first connecting gear, a first speed ratio tubular shaft coaxially positioned on said first countershaft in rotatable relation thereto, a second speed ratio tubular shaft coaxially positioned on said second countershaft in rotatable relation thereto, a third speed ratio tubular shaft coaxially positioned on said third countershaft in rotatable relation thereto, first and second speed ratio gears nonrotatably secured to said first speed ratio tubular shaft, a third speed ratio gear nonrotatably secured to said second speed ratio tubular shaft and meshing with said first speed ratio gear, a fourth speed ratio gear nonrotatably secured to said third speed ratio tubular shaft and meshing with said second speed ratio gear, means to rotate said countershafts, transmission output means operatively connected to one of said speed ratio tubular shafts to be rotated by said speed ratio tubular shafts, a first speed ratio clutch adapted to engage said first speed ratio tubular shaft to said first countershaft to transmit rotation from said countershaft to said output means at a first predetermined speed ratio, a second speed ratio clutch adapted to engage said second speed ratio tubular shaft to said second countershaft to transmit rotation from said counershafts to said output means at a second predetermined speed ratio, and a third speed ratio clutch adapted to engage said third speed ratio tubular shaft to said third countershaft to transmit rotation from said countershafts to said output means at a third predetermined speed ratio.

11. In a constant mesh transmission the combination comprising a housing, a first countershaft, a second countershaft, a third countershaft, and a fourth countershaft, all of said countershafts arranged in spaced parallel relation to each other, a first connecting gear nonrotatably secured to said first countershaft, a second connecting gear nonrotatably secured to said second countershaft and meshing with said first connecting gear, a third connecting gear nonrotatably secured to said third countershaft and meshing with said first connecting gear, a fourth connecting gear nonrotatably secured to said fourth countershaft and meshing with said first connecting gear, a first speed ratio tubular shaft coaxially positioned on said first countershaft in rotatable relation thereto, a second speed ratio tubular shaft coaxially positioned on said second countershaft in rotatable relation thereto, a third speed ratio tubular shaft coaxially positioned on said third countershaft in rotatable relation thereto, a fourth speed ratio tubular shaft coaxially positioned on said fourth countershaft in rotatable relation thereto, first, second, and third speed ratio gears nonrotatably secured to said first speed ratio tubular shaft, a fourth speed ratio gear nonrotatably secured to said second speed ratio tubular shaft and meshing with said first speed ratio gear, a fifth speed ratio gear nonrotatably secured to said third speed ratio tubular shaft and meshing with said second speed ratio gear, a sixth speed ratio gear nonrotatably secured to said fourth speed ratio tubular shaft and meshing with said third speed ratio gear, means to rotate said countershafts, a transmission output means operatively connected to one of said speed ratio tubular shafts to be rotated by said speed ratio tubular shafts, a first speed ratio clutch adapted to engage said first speed ratio tubular shaft to said first countershaft to transmit rotation from said countershafts to said output means at a first predetermined speed ratio, a second speed ratio clutch adapted to engage said second speed ratio tubular shaft to said second countershaft to transmit rotation from said countershafts to said output means at a second predetermined speed ratio, a third speed ratio clutch adapted to engage said third speed ratio tubular shaft to said third countershaft to transmit rotation from said countershafts to said output means at a third predetermined speed ratio, and a fourth speed ratio clutch adapted to engage said fourth speed ratio tubular shaft to said fourth countershaft to transmit rotation from said countershafts to said output means at a fourth predetermined speed ratio.

12. A constant mesh transmission comprising a housing including a connecting section, a plurality of shafts journaled for rotation in parallel, spaced relation within said housing, a connecting gear nonrotatably secured to each of said shafts, a constantly meshing connecting gear train formed of only said connecting gears arranged so that said shafts rotate upon rotation of any one shaft, said connecting gear train positioned within said housing connecting section, a transmission input shaft, a transmission output shaft, first drive means to selectively and operatively connect said input shaft to said shafts, said first drive means including clutch means and gearing adapted to provide said shafts with a plurality of speeds in one direction, and second drive means including speed ratio clutch means to selectively and operatively connect said shafts to said output shaft.

13. A constant mesh transmission comprising a housing including a range section, a connecting section and a speed ratio section, a plurality of shafts journaled for rotation relative to said housing in parallel spaced relation to each other, at least some of said shafts extending through said housing range section, through said connecting section, and through said speed ratio section, a connecting gear nonrotatably secured to each of said shafts, a constantly meshing connecting gear train formed of only said connecting gears arranged so that said shafts rotate upon rotation of any one shaft, said connecting gears positioned within said housing connecting section, a constantly meshing range gear train disposed within said housing range section, transmission input means to drive said range gear train, means including directional clutch means to selectively and operatively engage said range gear train to said shafts, a constantly meshing speed ratio gear train disposed within said housing speed ratio section, transmission output means driven by said speed ratio gear train, and means including speed ratio clutch means to selectively and operatively engage said shafts to said speed ratio gear train.

14. In a constant mesh transmission having a plurality of speeds in both directions the combination comprising a housing, three countershafts journaled in said housing in spaced parallel relation to each other, each of said countershafts having a spur gear nonrotatably secured thereto, said spur gears arranged to drivingly connect said countershafts to each other, directional gears coaxially mounted on certain of said countershafts, said directional gears being rotatable relative to said respective countershafts extending therethrough, directional clutches arranged to selectively connect said respective directional gear to said respective countershaft extending therethrough for rotation therewith so that motion is transmitted from said directional gear through said directional clutch to all of said countershafts, means to rotate said directional gears, a tubular shaft arranged coaxially on one of said countershafts in rotatable relation thereto, constantly meshing change speed gearing arranged in said housing, said tubular shaft drivingly connected to said change speed gearing, change speed clutches arranged to selectively effect drive to said change speed gearing from said countershafts, and output means operatively connected to said tubular shaft.

15. In a constant mesh transmission having a plurality of speeds in both directions the combination comprising a housing, three countershafts journaled in said housing in spaced parallel relation to each other, each of said countershafts having a spur gear nonrotatably secured thereto, said spur gears arranged to drivingly connect said countershafts to each other, each of said countershafts having a tubular shaft arranged coaxially thereon in rotatable relation thereto, gearing connecting one of said tubular shafts to another of said tubular shafts and a third of said tubular shafts to said last named tubular shafts, input means to drive said gearing, directional clutches arranged to selectively connect said respective tubular shafts to said respective countershaft extending therethrough for rotation therewith so that motion is selectively transmitted from said respective tubular shaft through said respective directional clutch to all of said countershafts, a fourth tubular shaft arranged coaxially on one of said countershafts in rotatable relation thereto, constantly meshing change speed gearing arranged in said housing, said change speed gearing drivingly connected to said fourth tubular shaft, change speed clutches arranged to selectively effect drive to said change speed gearing from said countershafts, and output means connected to said fourth tubular shaft.

16. In a constant mesh transmission having a plurality of speeds in both directions the combination comprising a housing, three countershafts journaled in said housing in spaced parallel relation to each other, each of said countershafts having a spur gear nonrotatably secured thereto, said spur gears arranged to drivingly connect said countershafts to each other, directional gears coaxially mounted on certain of said countershafts, said directional gears being rotatable relative to said respective countershafts extending therethrough, directional clutches arranged to selectively connect said respective directional gear to said respective countershaft extending therethrough for rotation therewith so that motion is transmitted from said directional gear through said directional clutch to all of said countershafts, means to rotate said directional gears, a tubular shaft arranged coaxially on one of said countershafts in rotatable relation thereto, constantly meshing change speed gearing arranged in said housing, said tubular shaft drivingly connected to said change speed gearing, change speed clutches arranged to selectively effect drive to said change speed gearing from said countershafts, said tubular shaft and said coaxial countershaft having end portions projecting from said housing, one of said change speed clutches positioned exteriorly of said housing, said last named change speed clutch having a housing portion rotatable relative to said last named countershaft and secured to said tubular shaft for rotation therewith, and output means connected to said last named change speed clutch housing.

17. In a constant mesh transmission the combination comprising a housing, a first countershaft, a second countershaft, and a third countershaft, all of said countershafts arranged in spaced parallel relation to each other, a first connecting gear nonrotatably secured to said first countershaft, a second connecting gear nonrotatably secured to said second countershaft and meshing with said first connecting gear, a third connecting gear nonrotatably secured to said third countershaft and meshing with said first connecting gear, a first range tubular shaft coaxially positioned on said first countershaft in rotatable relation thereto, a second range tubular shaft coaxially positioned on said second countershaft in rotatable relation thereto, a third range tubular shaft coaxially positioned on said third countershaft in rotatable relation thereto, a first range gear nonrotatably secured to said first range tubular shaft, a second range gear nonrotatably secured to said second range tubular shaft and meshing with said first range gear, a third range gear nonrotatably secured to said second range tubular shaft, a fourth range gear nonrotatably secured to said third range tubular shaft and meshing with said third range gear, a first directional clutch adapted to engage said first range tubular shaft to said first countershaft, a second directional clutch adapted to engage said second range tubular shaft to said second countershaft, a third directional clutch adapted to engage said third range tubular shaft to said third countershaft, transmission input means operatively connected to one of said range tubular shafts to rotate said range tubular shafts, said first directional clutch adapted upon engagement to rotate said countershafts in given directions at first predetermined speeds, said second directional clutch adapted upon engagement to rotate said countershafts in said given directions at second predetermined speeds, said third directional clutch adapted upon engagement to rotate said countershafts in directions opposite to said given directions at a predetermined speed, a first speed ratio tubular shaft coaxially positioned on said first countershaft in rotatable relation thereto, a second speed ratio tubular shaft coaxially positioned on said second countershaft in rotatable relation thereto, a third speed ratio tubular shaft coaxially positioned on said third countershaft in rotatable relation thereto, first and second speed ratio gears nonrotatably secured to said first speed ratio tubular shaft, a third speed ratio gear nonrotatably secured to said second speed ratio tubular shaft and meshing with said first speed ratio gear, a fourth speed ratio gear nonrotatably secured to said third speed ratio tubular shaft and meshing with said second speed ratio gear, transmission output means operatively connected to one of said speed ratio tubular shafts to be rotated by said speed ratio tubular shafts, a first speed ratio clutch adapted to engage said first speed ratio tubular shaft to said first countershaft to transmit rotation from said countershafts to said output means at a first predetermined speed ratio, a second speed ratio clutch adapted to engage said second speed ratio tubular shaft to said second countershaft to transmit rotation from said countershafts to said output means at a second predetermined speed ratio, and a third speed ratio clutch adapted to engage said third speed ratio tubular shaft to said third countershaft to transmit rotation from said countershafts to said output means at a third predetermined speed ratio.

18. In a constant mesh transmission the combination comprising a housing, a first countershaft, a second countershaft, a third countershaft, all of said countershafts arranged in spaced parallel relation to each other, a first connecting gear nonrotatably secured to said first countershaft, a second connecting gear nonrotatably secured to said second countershaft and meshing with said first connecting gear, a third connecting gear nonrotatably secured to said third countershaft and meshing with said first connecting gear, a first range tubular shaft coaxially positioned on said first countershaft in rotatable relation thereto, a second range tubular shaft coaxially positioned on said second countershaft in rotatable relation thereto, a third range tubular shaft coaxially positioned on said third countershaft in rotatable relation thereto, a first range gear nonrotatably secured to said first range tubular shaft, a second range gear nonrotatably secured to said second range tubular shaft and meshing with said first range gear, a third range gear nonrotatably secured to said third range tubular shaft and meshing with said second range gear, a first directional clutch adapted to engage said first range tubular shaft to said first countershaft, a second directional clutch adapted to engage said second range tubular shaft to said second countershaft, a third directional clutch adapted to engage said third range tubular shaft to said third countershaft, transmission input means operatively connected to one of said range tubular shafts to rotate said range tubular shafts, said first directional clutch adapted upon engagement to rotate said countershafts in given directions at first predetermined speeds, said second directional clutch adapted upon engagement to rotate said countershafts in said given directions at second predetermined speeds, said third directional clutch adapted upon engagement to rotate said countershafts in directions opposite to said given directions at a predetermined speed, a first speed ratio tubular shaft coaxially positioned on said first countershaft in rotatable relation thereto, a second speed ratio tubular shaft coaxially positioned on said second countershaft in rotatable relation thereto, a third speed ratio tubular shaft coaxially positioned on said third countershaft in rotatable relation thereto, first and second speed ratio gears nonrotatably secured to said first speed ratio tubular shaft, a third speed ratio gear nonrotatably secured to said second speed ratio tubular shaft and meshing with said first speed ratio gear, a fourth speed ratio gear nonrotatably secured to said third speed ratio tubular shaft and meshing with said second speed ratio gear, transmission output means operatively connected to one of said speed ratio tubular shafts to be rotated by said speed ratio tubular shafts, a first speed ratio clutch adapted to engage said first speed ratio tubular shaft to said first countershaft to transmit rotation from said countershafts to said output means at a first predetermined speed ratio, a second speed ratio clutch adapted to engage said second speed ratio tubular shaft to said second countershaft to transmit rotation from said countershafts to said output means at a second predetermined speed ratio, and a third speed ratio clutch adapted to engage said third speed ratio tubular shaft to said third countershaft to transmit rotation from said countershafts to said output means at a third predetermined speed ratio.

19. In a constant mesh transmission the combination comprising a housing, a first countershaft, a second countershaft, a third countershaft, and a fourth countershaft, all of said countershafts arranged in spaced parallel relation to each other, a first connecting gear nonrotatably secured to said first countershaft, a second connecting gear nonrotatably secured to said second countershaft and meshing with said first connecting gear, a third connecting gear nonrotatably secured to said third countershaft and meshing with said first connecting gear, a fourth connecting gear nonrotatably secured to said fourth countershaft and meshing with said first connecting gear, a first range tubular shaft coaxially positioned on said first countershaft in rotatable relation thereto, a second range tubular shaft coaxially positioned on said second countershaft in rotatable relatin thereto, a third range tubular shaft coaxially positioned on said third countershaft in rotatable relation thereto, a fourth range tubular shaft coaxially positioned on said fourth countershaft in rotatable relation thereto, a first range gear nonrotatably secured to said first range tubular shaft, a second range gear nonrotatably secured to said second range tubular shaft and meshing with said first range gear, a third range gear nonrotatably secured to said second range tubular shaft, a fourth range gear nonrotatably secured to said third range tubular shaft and meshing with said third range gear, a fifth range gear nonrotatably secured to said third range tubular shaft, a sixth range gear nonrotatably secured to said fourth range tubular shaft and meshing with said fifth range gear, a first directional clutch adapted to engage said first range tubular shaft to said first countershaft, a second directional clutch adapted to engage said second range tubular shaft to said second countershaft, a third directional clutch adapted to engage said third range tubular shaft to said third countershaft, a fourth directional clutch adapted to engage said fourth range tubular shaft to said fourth countershaft, transmission input means operatively connected to one of said range tubular shafts to rotate said range tubular shafts, said first directional clutch adapted upon engagement to rotate said countershafts in given directions at first predetermined speeds, said second directional clutch adapted upon engagement to rotate said countershafts in said given directions at second predetermined speeds, said fourth directional clutch adapted upon engagement to rotate said countershafts in said given directions at third predetermined speeds, said third directional clutch adapted upon engagement to rotate said countershafts in directions opposite to said given directions at a predetermined speed, a first speed ratio tubular shaft coaxially positioned on said first countershaft in rotatable relation thereto, a second speed ratio tubular shaft coaxially positioned on said second countershaft in rotatable relation thereto, a third speed ratio tubular shaft coaxially positioned on said third countershaft in rotatable relation thereto, first and second speed ratio gears nonrotatably secured to said first speed ratio tubular shaft, a third speed ratio gear nonrotatably secured to said second speed ratio tubular shaft and meshing with said first speed ratio gear, a fourth speed ratio gear nonrotatably secured to said third speed ratio tubular shaft and meshing with said second speed ratio gear, a transmission output means operatively connected to one of said speed ratio tubular shafts to be rotated by said speed ratio tubular shafts, a first speed ratio clutch adapted to engage said first speed ratio tubular shaft to said first countershaft to transmit rotation from said countershafts to said output means at a first predetermined speed ratio, a second speed ratio clutch adapted to engage said second speed ratio tubular shaft to said second countershaft to transmit rotation from said countershafts to said output means at a second predetermined speed ratio, and a third speed ratio clutch adapted to engage said third speed ratio tubular shaft to said third countershaft to transmit rotation from said countershafts to said output means at a third predetermined speed ratio.

20. In a constant mesh transmission the combination comprising a housing, a first countershaft, a second countershaft, a third countershaft, and a fourth countershaft, all of said countershafts arranged in spaced parallel relation to each other, a first connecting gear nonrotatably secured to said first countershaft, a second connecting gear nonrotatably secured to said second countershaft and meshing with said first connecting gear, a third connecting gear nonrotatably secured to said third countershaft and meshing with said first connecting gear, a fourth connecting gear nonrotatably secured to said fourth countershaft and meshing with said first connecting gear, a first range tubular shaft coaxially positioned on said first countershaft in rotatable relation thereto, a second range tubular shaft coaxially positioned on said second countershaft in rotatable relation thereto, a third range tubular shaft coaxially positioned on said third countershaft in rotatable relation thereto, a fourth range tubular shaft coaxially positioned on said fourth countershaft in rotatable relation thereto, a first range gear nonrotatably secured to said first range tubular shaft, a second range gear nonrotatably secured to said second range tubular shaft and meshing with said first range gear, a third range gear nonrotatably secured to said second range tubular shaft, a fourth range gear nonrotatably secured to said third range tubular shaft and meshing with said third range gear, a fifth range gear nonrotatably secured to said third range tubular shaft, a sixth range gear nonrotatably secured to said fourth range tubular shaft and meshing with said fifth range gear, a first directional clutch adapted to engage said first range tubular shaft to said first countershaft, a second directional clutch adapted to engage said second range tubular shaft to said second countershaft, a third directional clutch adapted to engage said third range tubular shaft to said third countershaft, a fourth directional clutch adapted to engage said fourth range tubular shaft to said fourth countershaft, transmission input means operatively connected to one of said range tubular shafts to rotate said range tubular shafts, said first directional clutch adapted upon engagement to rotate said countershafts in given directions at first predetermined speeds, said second directional clutch adapted upon engagement to rotate said countershafts in said given directions at second predetermined speeds, said fourth directional clutch adapted upon engagement to rotate said countershafts in said given directions at third predetermined speeds, said third directional clutch adapted upon engagement to rotate said countershafts in directions opposite to said given directions at a predetermined speed, a first speed ratio tubular shaft coaxially positioned on said first countershaft in rotatable relation thereto, a second speed ratio tubular shaft coaxially positioned on said second countershaft in rotatable relation thereto, a third speed ratio tubular shaft coaxially positioned on said third countershaft in rotatable relation thereto, a fourth speed ratio tubular shaft coaxially positioned on said fourth countershaft in rotatable relation thereto, first, second and third speed ratio gears nonrotatably secured to said first speed ratio tubular shaft, a fourth speed ratio gear nonrotatably secured to said second speed ratio tubular shaft and meshing with said first speed ratio gear, a fifth speed ratio gear nonrotatably secured to said third speed ratio tubular shaft and meshing with said second speed ratio gear, a sixth speed ratio gear nonrotatably secured to said fourth speed ratio tubular shaft and meshing with said third speed ratio gear, transmission output means operatively connected to one of said speed ratio tubular shafts to be rotated by said speed ratio tubular shafts, a first speed ratio clutch adapted to engage said first speed ratio tubular shaft to said first countershaft to transmit rotation from said countershafts to said output means at a first predetermined speed ratio, a second speed ratio clutch adapted to engage said second speed ratio tubular shaft to said second countershaft to transmit rotation from said countershafts to said output means at a second predetermined speed ratio, a third speed ratio clutch adapted to engage said third speed ratio tubular shaft to said third countershaft to transmit rotation from said countershafts to said output means at a third predetermined speed ratio, and a fourth speed ratio clutch adapted to engage said fourth speed ratio tubular shaft to said fourth countershaft to transmit rotation from said countershafts to said output means at a fourth predetermined speed ratio.

21. A constant mesh transmission as set forth in claim 1 in which said constantly meshing range gear train causes each gear of said range gear train to rotate at a predetermined fixed speed ratio and direction relative to said transmission input means so that when said transmission input means undergoes speed changes the speeds of the rotating masses of said range gear train remain closely matched to the speed of said transmission input means.

22. A constant mesh transmission as set forth in claim 1 in which each of said shafts has a range gear coaxially mounted thereon in rotatable relation thereto.

23. A constant mesh transmission as set forth in claim 1 in which said connecting gears positioned in said housing connecting section are arranged in substantially the same vertical plane.

24. A constant mesh transmission as set forth in claim 9 in which said connecting gears positioned in said housing connection section are arranged in substantially the same vertical plane.

25. A constant mesh transmission as set forth in claim 9 in which the number of shafts is equal to the number of different speeds provided by the speed ratio gear train in said speed ratio section.

26. A constant mesh transmission as set forth in claim 12 in which said input shaft and said output shaft are coaxially aligned.

27. A constant mesh transmission as set forth in claim 12 in which said input shaft and said output shaft are both coaxially aligned with one of said shafts journaled in said housing.

28. A constant mesh transmission as set forth in claim 13 in which said transmission input means includes an input shaft and said transmission output means includes an output shaft, both said input and said output shaft being coaxially aligned with one of said shafts journaled for rotation in said housing, said directional clutch means and said speed ratio clutch means arranged to connect the last named shaft to said input shaft and said output shaft to thereby transmit rotation from said input shaft to said output shaft through said directional clutch means, said shaft and said speed ratio clutch means.

References Cited in the file of this patent

UNITED STATES PATENTS

| | | |
|---|---|---|
| 2,511,539 | Orr | June 13, 1950 |
| 2,553,376 | LeTourneau | May 15, 1951 |
| 2,811,048 | Dence et al. | Oct. 29, 1957 |
| 2,867,126 | Bolster | Jan. 6, 1959 |
| 2,869,382 | Klecker et al. | Jan. 20, 1959 |
| 2,912,872 | Gerst | Nov. 17, 1959 |
| 2,953,941 | Schwartz et al. | Sept. 27, 1960 |
| 2,953,942 | Schwartz et al. | Sept. 27, 1960 |

UNITED STATES PATENT OFFICE
CERTIFICATE OF CORRECTION

Patent No. 3,064,488                        November 20, 1962

Arthur L. Lee et al.

It is hereby certified that error appears in the above numbered patent requiring correction and that the said Letters Patent should read as corrected below.

Column 1, line 19, for "732,741" read -- 732,471 --; column 16, line 62, for "utbular" read -- tubular --; same line 62, strike out "shaft"; column 33, line 12, for "relatin" read -- relation --; column 35, line 24, for "connection" read -- connecting --.

Signed and sealed this 14th day of May 1963.

(SEAL)
Attest:

ERNEST W. SWIDER                        DAVID L. LADD
Attesting Officer                          Commissioner of Patents